United States Patent
Li et al.

(10) Patent No.: US 12,231,946 B2
(45) Date of Patent: Feb. 18, 2025

(54) COMMUNICATIONS METHOD AND APPARATUS

(71) Applicant: Huawei Technologies Co., Ltd., Shenzhen (CN)

(72) Inventors: Yongcui Li, Beijing (CN); Yizhuang Wu, Beijing (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 610 days.

(21) Appl. No.: 17/520,112

(22) Filed: Nov. 5, 2021

(65) Prior Publication Data

US 2022/0060935 A1 Feb. 24, 2022

Related U.S. Application Data

(63) Continuation of application No. PCT/CN2020/088794, filed on May 6, 2020.

(30) Foreign Application Priority Data

May 7, 2019 (CN) .......................... 201910377582.8

(51) Int. Cl.
*H04W 28/02* (2009.01)
*H04L 47/2408* (2022.01)
(Continued)

(52) U.S. Cl.
CPC ..... *H04W 28/0268* (2013.01); *H04L 47/2408* (2013.01); *H04L 47/2491* (2013.01);
(Continued)

(58) Field of Classification Search
CPC ......... H04W 28/0268; H04W 28/0975; H04W 28/24; H04L 47/2408; H04L 47/2491; H04L 47/28
See application file for complete search history.

(56) References Cited

U.S. PATENT DOCUMENTS

2014/0219167 A1 8/2014 Santhanam et al.
2015/0058770 A1 2/2015 Steinbach et al.
(Continued)

FOREIGN PATENT DOCUMENTS

CN 104969605 A 10/2015
CN 107592974 A 1/2018
(Continued)

OTHER PUBLICATIONS

3GPP TS 23.502 V15.2.0 "3rd Generation Partnership Project; Technical Specification Group Services and System Aspects; Procedures for the 5G System; Stage 2 (Release 15)," Jun. 2018, 308 pages.

(Continued)

*Primary Examiner* — Brenda H Pham
(74) *Attorney, Agent, or Firm* — Conley Rose, P.C.

(57) ABSTRACT

A communications method and apparatus, where the method includes: sending, by a session management network element, first indication information when the session management network element determines, based on first information, to establish a first low-latency service flow for a session, wherein the first indication information is used to indicate to set the session to an always-on session. According to solutions of this application, when determining to establish the low-latency service flow, the session management network element flexibly indicates to a terminal apparatus to set the session to the always-on session. This avoids a resource waste caused by setting the session to the always-on session all the time, and avoids a transmission latency caused when the session is not set to the always-on session in time, such that resource utilization and transmission efficiency are improved.

21 Claims, 19 Drawing Sheets

(51) Int. Cl.
*H04L 47/2491* (2022.01)
*H04L 47/28* (2022.01)
*H04W 28/08* (2023.01)
*H04W 28/24* (2009.01)

(52) U.S. Cl.
CPC ......... *H04L 47/28* (2013.01); *H04W 28/0975* (2020.05); *H04W 28/24* (2013.01)

(56) References Cited

U.S. PATENT DOCUMENTS

| | | | |
|---|---|---|---|
| 2015/0195788 | A1 | 7/2015 | Au et al. |
| 2016/0262068 | A1 | 9/2016 | Won et al. |
| 2017/0188252 | A1* | 6/2017 | Miao ........................ H04W 8/02 |
| 2018/0205599 | A1 | 7/2018 | Lee et al. |
| 2018/0227866 | A1 | 8/2018 | Jung et al. |
| 2019/0069327 | A1* | 2/2019 | Kim ......................... H04W 4/24 |
| 2020/0178321 | A1 | 6/2020 | Liu et al. |
| 2021/0076444 | A1 | 3/2021 | Shu et al. |

FOREIGN PATENT DOCUMENTS

| | | |
|---|---|---|
| CN | 109548137 A | 3/2019 |
| CN | 109661039 A | 4/2019 |
| CN | 110519775 A | 11/2019 |
| CN | 110831091 A | 2/2020 |
| RU | 2654539 C2 | 5/2018 |
| WO | 2018064128 A1 | 4/2018 |

OTHER PUBLICATIONS

Huawei, et al., "Discussion on network control for always-on PDU sessions," 3GPP TSG CT WG1 Meeting #112, C1-185218, Aug. 20-24, 2018, 5 pages.

Catt, "Discussion on Session Management for always-on PDU sessions," 3GPP TSG CT WG1 Meeting #112, C1-185298, Aug. 20-24, 2018, 3 pages.

"PCF selection for the PDU sessions having the same UE id, DNN and S-NSSAI combination," 3GPP TSG-SA2 Meeting #132, S2-1903002, Apr. 8-12, 2019, Xi'an, China, 24 pages.

3GPP TS 23.501 V16.0.2, Apr. 2019, "3rd Generation Partnership Project; Technical Specification Group Services and System Aspects; System Architecture for the 5G System; Stage 2 (Release 16)," 317 pages.

3GPP TS 23.502 V16.0.2, Apr. 2019, "3rd Generation Partnership Project; Technical Specification Group Services and System Aspects; Procedures for the 5G System; Stage 2 (Release 16)," 419 pages.

3GPP TS 24.501 V15.2.0, Dec. 2018, "3rd Generation Partnership Project; Technical Specification Group Core Network and Terminals; Non-Access-Stratum (NAS) protocol for 5G System (5GS); Stage 3 (Release 15)," 455 pages.

3GPP TR 38.913 V15.0.0, Jun. 2018, "3rd Generation Partnership Project; Technical Specification Group Radio Access Network; Study on Scenarios and Requirements for Next Generation Access Technologies; (Release 15);" 39 pages.

C1-182708, Samsung, et al., "SR in 5G Alt 2," 3GPP TSG-CT WG1 Meeting #110, Kunming (P.R. of China), Apr. 16-20, 2018, 9 pages.

Huawei, "Discussion on network control for always-on PDU sessions" 3GPP TSG CT WG1 Meeting #111bis ,Sophia-Antipolis (France), Jul. 9-13, 2018, C1-184315, 4 pages.

Ericsson, et al., "Session-TMBR for PDU session in W-5GAN. 3GPP TSG CT WG1 Meeting #116, Xi"an (P.R. of China), Apr. 8-12, 2019, C1-192013, 20 pages.

Spreadtrum Communications, et al., "Modification of the maximum number of supported packet filters," 3GPP TSG-CT WG1 Meeting #116, Xi'an (China), Apr. 8-12, 2019, C1-192761, 5 pages.

Nokia, et al., "UE criteria to request always-on PDU session," 3GPP TSG-SA WG2 Meeting #129bis, S2-1812341, Nov. 26-30, West Palm Beach, USA, 6 pages.

Nokia, et al., S2-1812344, "Alignment for always-on PDU sessions," 3GPP TSG-SA WG2 Meeting #129bis, Nov. 26-30, 2018, West Palm Beach, USA,total 2 pages.

Huawei, et al., "Clarifications on URLLC support," 3GPP TSG-SA WG2 Meeting #132, S2-1904651, Apr. 8-12, 2019, Xi'an, China, 5 pages.

* cited by examiner

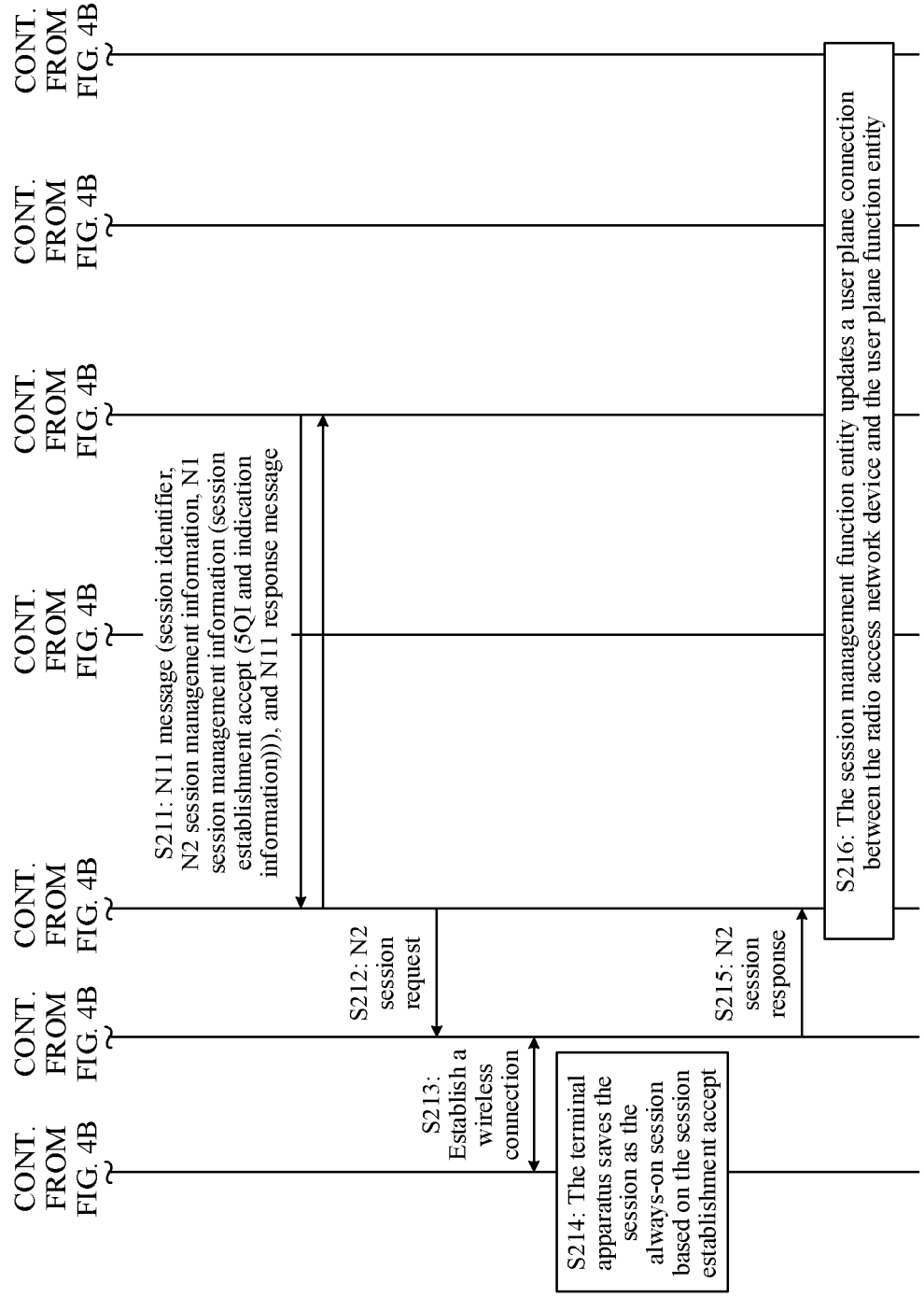

CONT. FROM FIG. 5B

CONT. FROM FIG. 5B

CONT. FROM FIG. 5B

S305: N4 session modification response message

CONT. FROM FIG. 5B

S306: N11 message or N11 response message

S307: N2 session modification request and N2 session modification response

CONT. FROM FIG. 5B

S307: N2 session modification request

S308: Configure a wireless connection

CONT. FROM FIG. 5B

S309: The terminal apparatus modifies, based on the received session modification request, the session to the always-on session or the non-always-on session S310: Another step of session modification, for example, update a user plane path between the radio access network device and the user plane function entity

FIG. 5C

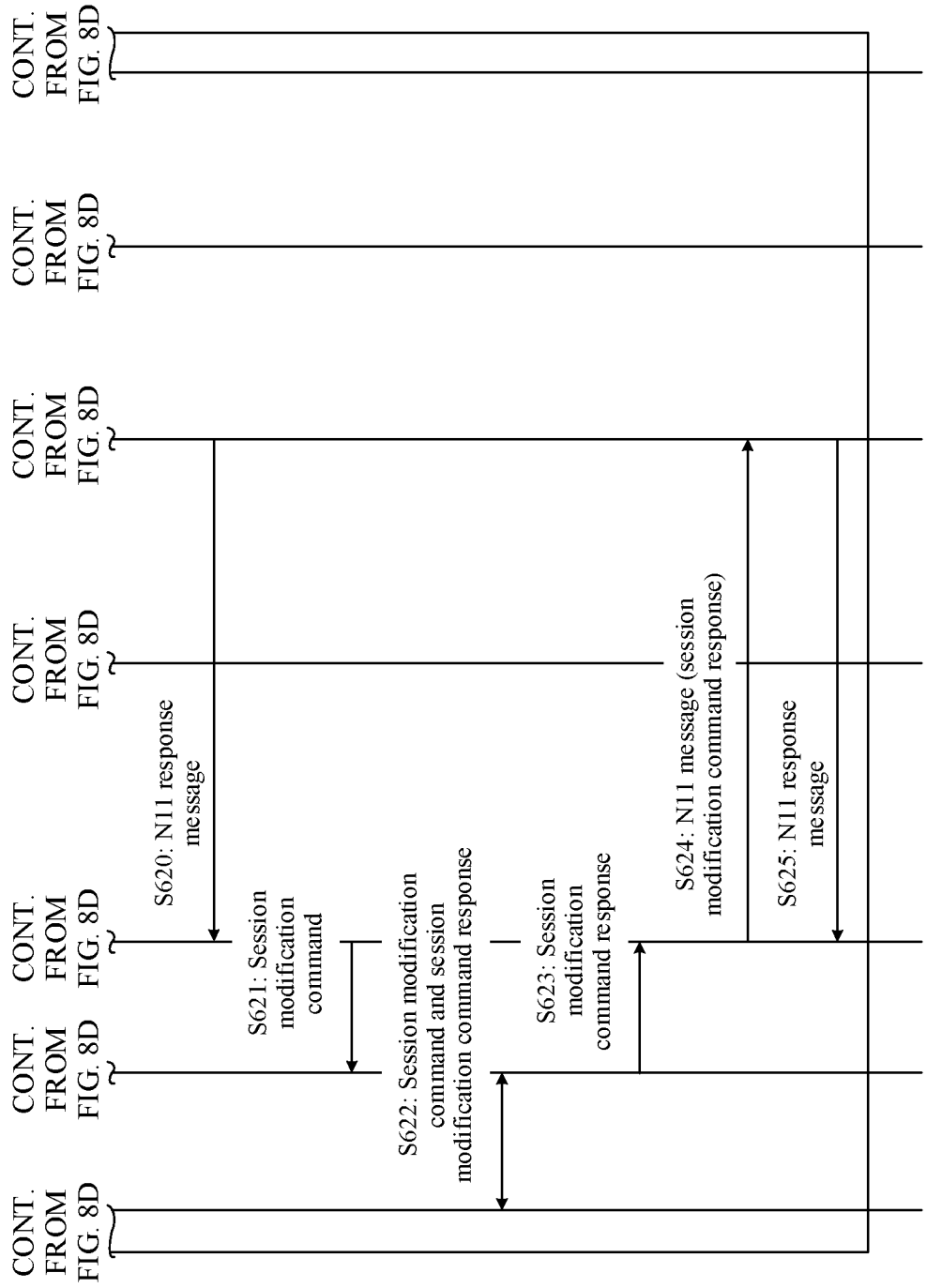

COMMUNICATIONS METHOD AND APPARATUS

CROSS-REFERENCE TO RELATED APPLICATIONS

This is a continuation of International Patent Application No. PCT/CN2020/088794, filed on May 6, 2020, which claims priority to Chinese Patent Application No. 201910377582.8, filed on May 7, 2019. The disclosures of the aforementioned applications are hereby incorporated by reference in their entireties.

TECHNICAL FIELD

This application relates to the field of communications technologies, and in particular, to a communications method and apparatus.

BACKGROUND

The $3^{rd}$ Generation Partnership Project (3GPP) organization has defined three major scenarios of the $5^{th}$ generation (5G) mobile communications: enhanced mobile broadband (eMBB), massive machine type communications (mMTC), and ultra-reliable and low-latency communications (URLLC). Features of the URLLC are high reliability, low latency, and extremely high availability.

The 3GPP further defines an always-on protocol data unit (PDU) session. For the always-on session, each time a terminal apparatus changes from an idle state to a connected state, the terminal apparatus requests a network side to activate, for the PDU session, a corresponding user plane network resource, including a data radio bearer (DRB) and a core network connection. In this way, if data needs to be transmitted, the data can be directly transmitted without queuing for requesting a network resource. This can satisfy a latency requirement of a service. Therefore, the 3GPP specifies that when a service flow used to provide a service for a URLLC service exists in a session, the terminal apparatus should request to establish the session as an always-on session.

However, how does the terminal apparatus determine that the session serves a low-latency service, and request a core network to establish the always-on session? In a manner, an always-on preference is added to a terminal apparatus route selection policy such as a user equipment (UE) route selection policy (URSP). When the terminal apparatus starts an application (APP) to initiate a session establishment procedure, the terminal apparatus determines, using the URSP, that the APP requires to establish the always-on session, and in this case, the terminal apparatus includes an always-on session request (always-on PDU session requested) in a session establishment request. However, this solution requires modification to the terminal apparatus, and imposes a relatively high requirement on the terminal apparatus. In another manner, when the terminal apparatus receives an upper-layer indication, the terminal apparatus requests to establish the always-on session. However, this manner is relatively static, and whether to set the session to the always-on session cannot be flexibly determined.

Therefore, in this application, a problem of how to flexibly set the session to the always-on session needs to be resolved.

SUMMARY

This application provides a communications method and apparatus, to flexibly set a session to an always-on session, so as to improve resource utilization and transmission efficiency.

According to a first aspect, a communications method is provided. The method includes: sending, by a session management network element, first indication information when the session management network element determines, based on first information, to establish a first low-latency service flow for a session, where the first information includes at least one of the following: local configuration information, subscription data, or a first quality of service (QoS) parameter, and where the first indication information is used to indicate to set the session to an always-on session. In this aspect, when determining, based on the local configuration information, the subscription data, and the QoS parameter, to establish the low-latency service flow, the session management network element flexibly indicates a terminal apparatus to set the session to the always-on session. This avoids a resource waste caused by setting the session to the always-on session all the time, and avoids a transmission latency caused when the session is not set to the always-on session in time, such that resource utilization and transmission efficiency are improved.

In an implementation, before the sending, by a session management network element, first indication information, the method further includes: determining, by the session management network element based on a session context of the session, that the session is a non-always-on session. In this implementation, before indicating to set the session to the always-on session, the session management network element determines, based on the session context of the session, that the session is the non-always-on session.

In another implementation, before the sending, by a session management network element, first indication information, the method further includes: determining, by the session management network element based on the session context of the session, that the session does not include a second low-latency service flow. In this implementation, when the session management network element determines, based on the session context, that the session does not include another low-latency service flow, the session is not the always-on session currently. When determining, based on the first information, to establish the low-latency service flow for the session, the session management network element sends the first indication information to indicate the terminal device to set the session to the always-on session.

In another implementation, the method further includes: determining, by the session management network element based on at least the local configuration information and the first QoS parameter, that the first low-latency service flow allows to be established for the session, where the local configuration information includes a node capability of a radio access network device and/or a node capability of a user plane function network element. In this implementation, the session management network element may flexibly determine, based on the local configuration information and the QoS parameter, whether the low-latency service flow allows to be established for the session.

In another implementation, the method further includes: determining, by the session management network element based on at least the subscription data, that the terminal apparatus, or a data network name (DNN) and/or single network slice selection assistance information (S-NSSAI) that are/is accessed by the terminal apparatus allows establishing of the first low-latency service flow, where the subscription data includes one or more of the following information: an identifier of the terminal apparatus, the DNN, or the S-NSSAI.

In another implementation, after the sending, by a session management network element, first indication information, the method further includes: obtaining, by the session management network element, updated first information or a session modification request of the terminal apparatus; and sending, by the session management network element, second indication information when determining, based on the updated first information or the session modification request of the terminal apparatus, to delete the first low-latency service flow in the session or modify the first low-latency service flow to a non-low-latency service flow, where the second indication information is used to indicate to modify the session to the non-always-on session. In this implementation, the session management network element obtains the updated first information from the session management network element, a unified data management network element, a policy control network element, or the like. Alternatively, the terminal device may initiate the session modification request. When determining to delete the first low-latency service flow in the session or modify the first low-latency service flow to the non-low-latency service flow, the session management network element indicates the terminal device to modify the session to the non-always-on session, to avoid a resource waste caused by setting the session to the always-on session all the time.

In another implementation, before the sending, by the session management network element, second indication information, the method further includes: determining, by the session management network element based on a session context of the session, that the session is the always-on session. In this implementation, before indicating to set the session to the non-always-on session, the session management network element needs to determine that the session is the always-on session.

In another implementation, before the sending, by the session management network element, second indication information, the method further includes: determining, by the session management network element based on the session context of the session, that the session does not include the second low-latency service flow. In this implementation, before indicating to set the session to the non-always-on session, the session management network element needs to determine that the session does not include any other low-latency service flow. Because if the low-latency service flow exists in the session, the session needs to be the always-on session to ensure transmission efficiency. In this case, the session does not need to be modified to the non-always-on session.

According to a second aspect, a communications method is provided. The method includes: receiving, by a terminal apparatus, first indication information, where the first indication information is used to indicate to set a session to an always-on session; determining, by the terminal apparatus, that a user plane connection is deactivated; triggering, by the terminal apparatus, a resume procedure of the user plane connection; and setting, by the terminal apparatus, the session to the always-on session based on the first indication information. In this aspect, when receiving the indication for setting the session to the always-on session, the terminal device needs to determine that the user plane connection is activated. If the user plane connection is deactivated, the terminal device triggers the resume procedure of the user plane connection to resume the user plane connection, and then sets the session to the always-on session, to ensure that the always-on session is set reliably.

According to a third aspect, a communications method is provided. The method includes: receiving, by a terminal apparatus, a first QoS parameter, where the first QoS parameter is used to indicate a QoS characteristic of a service flow; and setting, by the terminal apparatus, the session to an always-on session based on the first QoS parameter. In this aspect, the terminal device may perceive, based on the received QoS parameter, that the established service flow is a low-latency service flow, and therefore set the session to the always-on session based on the QoS parameter. In this way, the always-on session is flexibly set. This avoids a resource waste caused by setting the session to the always-on session all the time, and avoids a transmission latency caused when the session is not set to the always-on session in time, such that resource utilization and transmission efficiency are improved.

In another implementation, the method further includes: determining, by the terminal apparatus, that a user plane connection is deactivated; and triggering, by the terminal apparatus, a resume procedure of the user plane connection. In this implementation, before setting the session to the always-on session, the terminal apparatus needs to determine that the user plane connection is activated. If the user plane connection is deactivated, the terminal apparatus triggers the resume procedure of the user plane connection to resume the user plane connection, and then sets the session to the always-on session, to ensure that the always-on session is set reliably.

According to a fourth aspect, a communications apparatus is provided. The communications apparatus has a function of implementing behavior of the communications apparatus in the first aspect or any implementation of the first aspect. The function may be implemented by hardware, or implemented by hardware executing corresponding software. The hardware or the software includes one or more modules corresponding to the foregoing function.

In a possible implementation, a processor and a memory are included in a structure of the communications apparatus. The processor is configured to support the apparatus in performing a corresponding function in the foregoing communications method. The memory is configured to couple to the processor, and the memory stores a necessary program (instruction) and/or necessary data of the apparatus. Optionally, the communications apparatus may further include a communications interface, configured to support communication between the apparatus and another network element.

In another possible implementation, the communications apparatus may include a unit or module for performing a corresponding function or action in the foregoing method.

In still another possible implementation, a processor and a transceiver apparatus are included. The processor is coupled to the transceiver apparatus. The processor is configured to execute a computer program or an instruction, to control the transceiver apparatus to send and receive information. When the processor executes the computer program or the instruction, the processor is further configured to implement the foregoing method. For example, the transceiver apparatus may be a transceiver, a transceiver circuit, or an input/output interface. When the communications apparatus is a chip, the transceiver apparatus is the transceiver circuit or the input/output interface.

When the communications apparatus is a chip, a sending unit may be an output unit, for example, an output circuit or a communications interface; and a receiving unit may be an input unit, for example, an input circuit or a communications interface. When the communications apparatus is a network device, a sending unit may be a transmitter or a transmitter, and a receiving unit may be a receiver or a receiver.

According to a fifth aspect, a communications apparatus is provided. The communications apparatus may implement the communications method according to the second aspect, the third aspect, or any implementation. For example, the communications apparatus may be a chip (such as a baseband chip or a communications chip) or a terminal device. The foregoing method may be implemented using software, hardware, or hardware executing corresponding software.

In a possible implementation, a processor and a memory are included in a structure of the communications apparatus. The processor is configured to support the apparatus in performing a corresponding function in the foregoing communications method. The memory is configured to couple to the processor, and the memory stores a necessary program (instruction) and/or necessary data of the apparatus. Optionally, the communications apparatus may further include a communications interface, configured to support communication between the apparatus and another network element.

In another possible implementation, the communications apparatus may include a unit or module for performing a corresponding function or action in the foregoing method.

In still another possible implementation, a processor and a transceiver apparatus are included. The processor is coupled to the transceiver apparatus. The processor is configured to execute a computer program or an instruction, to control the transceiver apparatus to send and receive information. When the processor executes the computer program or the instruction, the processor is further configured to implement the foregoing method. For example, the transceiver apparatus may be a transceiver, a transceiver circuit, or an input/output interface. When the communications apparatus is a chip, the transceiver apparatus is the transceiver circuit or the input/output interface.

When the communications apparatus is a chip, a sending unit may be an output unit, for example, an output circuit or a communications interface; and a receiving unit may be an input unit, for example, an input circuit or a communications interface. When the communications apparatus is a network device, a sending unit may be a transmitter or a transmitter, and a receiving unit may be a receiver or a receiver.

According to a sixth aspect, a computer-readable storage medium is provided. The computer-readable storage medium stores an instruction. When the instruction is run on a computer, the computer is enabled to perform the method according to each of the foregoing aspects.

According to a seventh aspect, a computer program product including an instruction is provided. When the computer program product runs on a computer, the computer is enabled to perform the method according to each of the foregoing aspects.

According to an eighth aspect, a communications system is provided. The communications system includes any communications apparatus on a network device side and/or any communications apparatus on a terminal side.

BRIEF DESCRIPTION OF DRAWINGS

The following describes the accompanying drawings required for describing embodiments or the background of this application.

FIG. 4A to FIG. 4C are a schematic interaction flowchart of newly establishing a session as an always-on session according to an embodiment of this application;

FIG. 5A to FIG. 5C are a schematic interaction flowchart of session modification according to an embodiment of this application;

FIG. 8A to FIG. 8E are a schematic interaction flowchart of session establishment and modification performed by a terminal apparatus according to an embodiment of this application;

DESCRIPTION OF EMBODIMENTS

The following describes embodiments of this application with reference to the accompanying drawings in the embodiments of this application.

Figure 1:
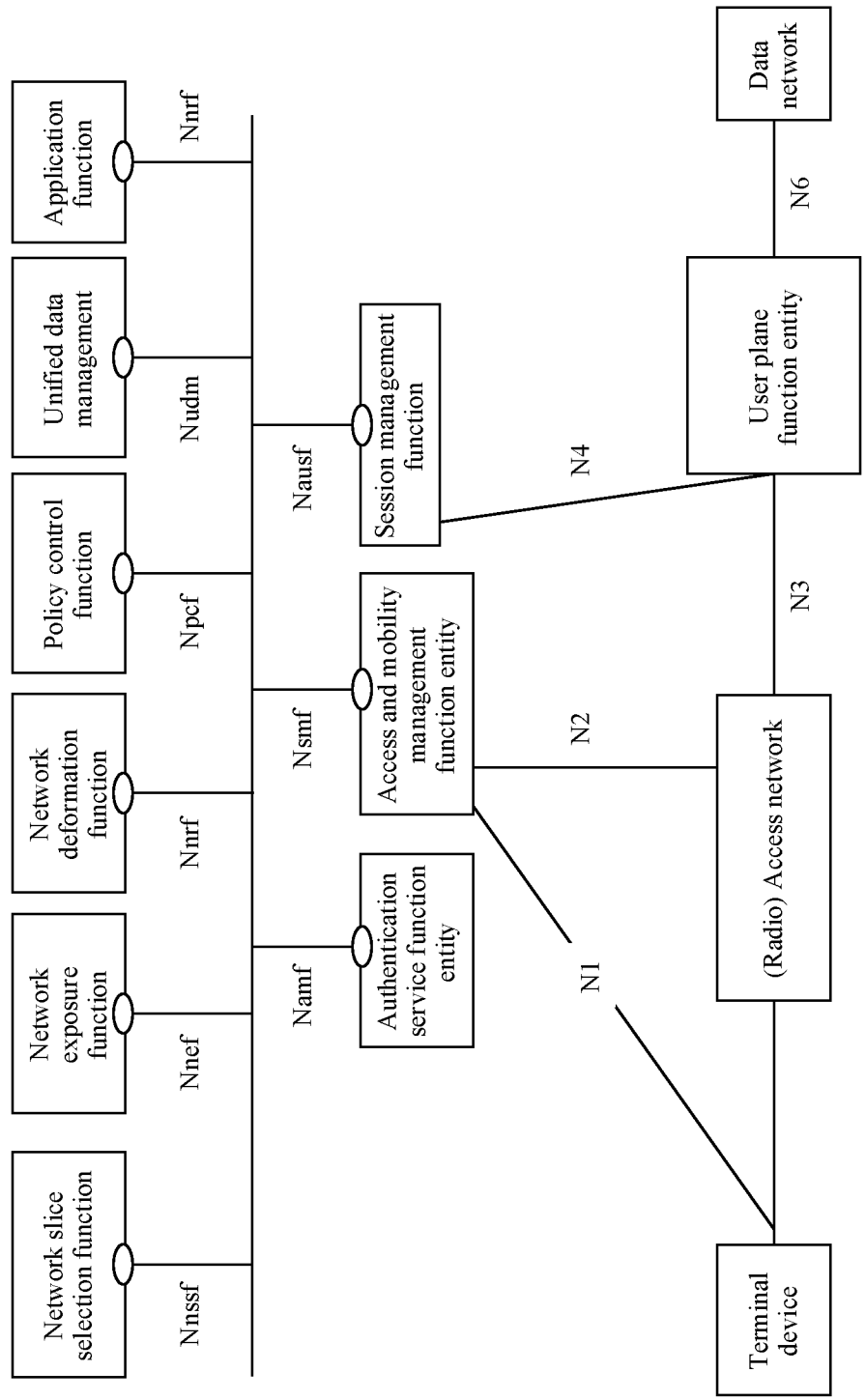
FIG. 1 is a schematic architectural diagram of an example communications system.
Figure 2:
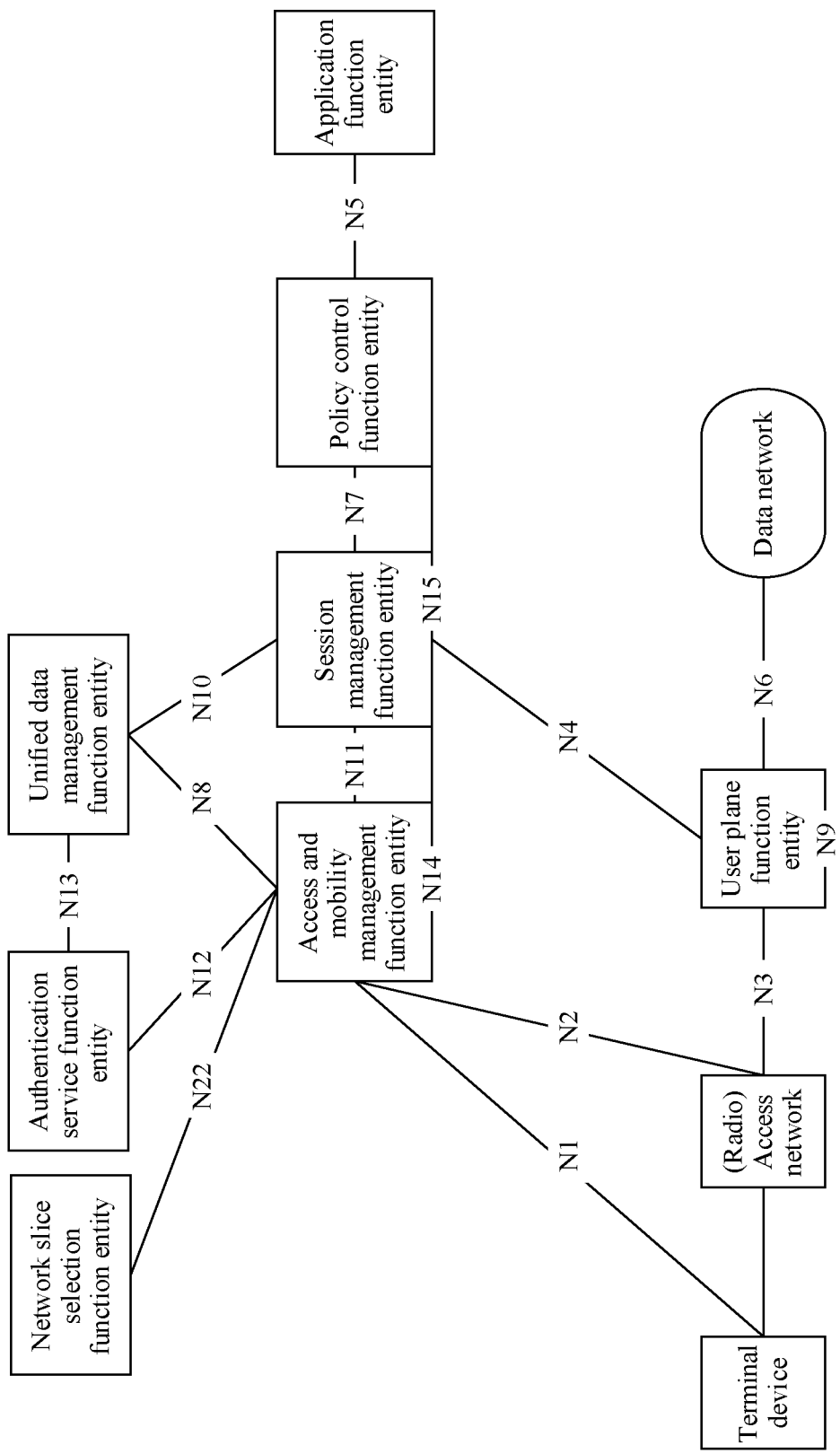
FIG. 2 is a schematic architectural diagram of another example communications system.

FIG. 1 is a schematic architectural diagram of an example communications system. The communications system mainly includes an access and mobility management function (AMF) entity, a session management function (SMF) entity, a user plane function (UPF) entity, a network exposure function (NEF) entity, and an application function (AF) entity. The communications system may further include a policy control function (PCF) entity, a unified data repository (UDR) function entity, and a unified data management (UDM) function entity. The foregoing function entities may also be referred to as network elements. For example, the access and mobility management function entity may be referred to as an access and mobility management network element, and the session management function entity may be referred to as a session management network element. FIG. 2 is a schematic architectural diagram of another example communications system. Function entities included in FIG. 2 and FIG. 1 and functions of the function entities may be the same. In FIG. 1, a service-oriented interface is used as a basis, and a message sent by a function entity to another function entity needs to carry an identifier of the other function entity. However, in FIG. 2, a reference point is used as a basis, and a message between the function entities is an interface-based message, and does not need to carry identifiers of the function entities.

The functions of the function entities in FIG. 1/FIG. 2 are as follows.

The AMF entity is mainly responsible for signaling processing, for example, functions such as access control, mobility management, attachment and detachment, and gateway selection. When the AMF entity provides a service for a session in a terminal, the AMF entity provides a control plane storage resource for the session, to store a session identifier, an SMF entity identifier associated with the session identifier, and the like.

The SMF entity is mainly responsible for session management, and is responsible for user plane function entity selection, user plane function entity redirection, Internet Protocol (IP) address assignment, bearer establishment, modification, and release, and quality of service (QoS) control.

The UPF entity is responsible for forwarding and receiving of user data in the terminal. The UPF entity may receive user data from a data network, and transmit the user data to the terminal through an access network device. Further, the UPF entity may receive user data from the terminal through the access network device, and forward the user data to the data network. A transmission resource and a scheduling function in the UPF entity that provide a service for the terminal are managed and controlled by the SMF entity.

The NEF entity mainly supports secure interaction between a 3GPP network and a third-party application. The NEF can securely expose a network capability and an event to the third-party application, to enhance or improve quality of service of the application. The 3GPP network can also securely obtain related data from the third-party application, to enhance intelligent decision-making of the network. In addition, the function entity supports restoring structured data from the UDR or storing structured data into the UDR.

The AF entity mainly supports interacting with the 3GPP network to provide a service, for example, affecting a data routing decision, affecting a policy control function, or providing some services (these services may be third-party ($3^{rd}$ party) services or may not be third-party services) for the network side.

The PCF entity mainly supports providing a unified policy framework to control network behavior, and providing a policy rule to a control layer network function, and is responsible for obtaining policy-related subscription information of a subscriber.

The UDR entity is mainly responsible for storing structured data, and stored content includes subscription data and policy data, externally exposed structured data, and application-related data.

The UDM entity is mainly configured to manage subscription information of the subscriber.

It should be noted that each foregoing function entity is only a name, and the name does not constitute a limitation on the entity. For example, the session management function entity may be replaced with a "session management function" or another name. In addition, the session management function entity may correspond to an entity that includes another function in addition to the session management function. The user plane function entity may be replaced with a "user plane function" or another name. In addition, the user plane function entity may correspond to an entity that includes another function in addition to the user plane function. A description is provided herein, and details are not described below again.

A terminal apparatus accesses a network using a radio access network (RAN) device or an access network (AN) device. The RAN device is mainly a wireless network device in the 3GPP network, and the AN may be an access network device defined in non-3GPP.

In this application, the terminal apparatus may be a user equipment (UE), a handheld terminal, a notebook computer, a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, or another device that can access the network. In addition, the terminal apparatus may alternatively be a chip.

The terminal apparatus may communicate with the RAN device using an air interface technology. The RAN device is mainly responsible for functions on an air interface side, such as radio resource management, quality of service (QoS) management, and data compression and encryption. The access network device may include various forms of base stations, such as a macro base station, a micro base station (also referred to as a small cell), a relay node, and an access point. In systems that use different radio access technologies, names of a device that has a base station function may be different. For example, in a 5G system, the device is referred to as a gNB; in a Long-Term Evolution (LTE) system, the device is referred to as an evolved NodeB (eNB or eNodeB); and in a 3rd generation (3G) system, the device is referred to as a NodeB or Node B.

The AN device allows a non-3GPP technology to be used for interconnection and interworking between the terminal and a 3GPP core network. For example, the non-3GPP technology is a Wi-Fi network, a Worldwide Interoperability for Microwave Access (WiMAX) network, or a code-division multiple access (CDMA) network.

Always-on Protocol Data Unit Session ("Always-on Session" for Short)

Currently, the 3GPP defines the always-on session. When the terminal changes from an idle state to a connected state, a user plane resource needs to be activated for the session. For the always-on session, each time the terminal apparatus changes from the idle state to the connected state, the terminal apparatus requests a network side to activate, for the PDU session, a corresponding user plane network resource, including a data radio bearer and a core network connection. In this way, if data needs to be transmitted, the data can be directly transmitted without queuing for requesting a network resource.

Low-Latency Service

In this application, the low-latency service includes a latency-sensitive service such as a URLLC service, a multimedia priority service, or a mission critical service (MCS).

URLLC Service

Features of the URLLC are high reliability, low latency, and extremely high availability. The URLLC includes the following scenarios and applications: industrial application and control, traffic safety and control, remote manufacturing, remote training, remote surgery, and the like.

Latency and reliability requirements of the URLLC are as follows.

Latency: For the URLLC service, a target uplink user plane latency is 0.5 milliseconds (ms), and a target downlink user plane latency is also 0.5 ms.

Reliability: The reliability is defined as a success rate of transmitting a data packet of X bytes within a specified latency. Generally, a reliability requirement on one transmission of the URLLC is as follows: A user plane latency is within 1 ms, and reliability of transmitting a packet of 32 bytes is 1 to $10^{\wedge(-5)}$.

When the terminal apparatus initiates session establishment, if the terminal apparatus considers that the session is used to provide a service for the URLLC service, the terminal apparatus sets the session to the always-on session, and sends a session establishment request to the SMF, where the session establishment request carries an always-on protocol data unit session request (always-on PDU session requested), to request to establish the always-on session.

However, how does the terminal apparatus determine that the current session serves the low-latency service, and establish the always-on session?

The embodiments of this application provide a communications method and apparatus. When determining, based on local configuration information, subscription data, and a QoS parameter, to establish a low-latency service flow, a session management network element flexibly indicates a terminal apparatus to set a session to an always-on session. This avoids a resource waste caused by setting the session to the always-on session all the time, and avoids a transmission latency caused when the session is not set to the always-on session in time, such that resource utilization and transmission efficiency are improved.

It should be noted that, terms "system" and "network" in the embodiments of this application may be used interchangeably. "A plurality of" means two or more than two. In view of this, "a plurality of" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, unless otherwise specified, the character "/" generally indicates an "or" relationship between the associated objects.

Figure 3:
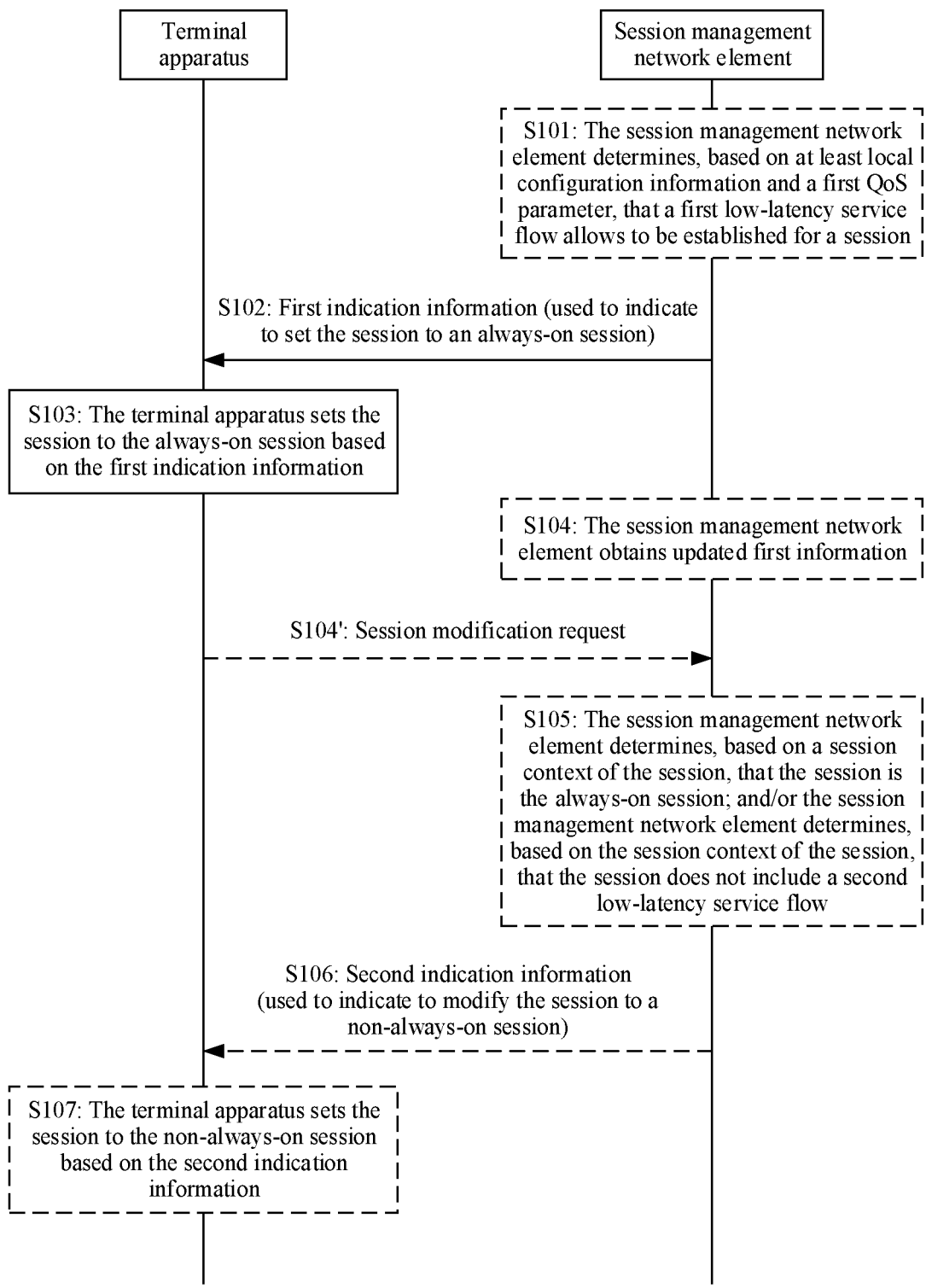
FIG. 3 is a schematic interaction flowchart of a communications method according to an embodiment of this application.

FIG. 3 is a schematic interaction flowchart of a communications method according to an embodiment of this application. For example, the method may include the following steps.

S101: A session management network element determines, based on at least local configuration information and a first QoS parameter, that a first low-latency service flow allows to be established for a session.

This step is optional and is represented by a dashed line in the figure. If the SMF determines that the first low-latency service flow allows to be established for the session, a subsequent step may be performed. If the SMF determines that the first low-latency service flow does not allow to be established for the session, a subsequent step may not be performed.

The local configuration information includes a node capability of a RAN and/or a node capability of a UPF that are/is configured on the SMF. For example, the RAN and the UPF are network elements that provide a service for the session, such that the SMF may determine, based on the node capability of the RAN and/or the node capability of the UPF, whether the session satisfies a condition for establishing the low-latency service flow.

In addition, the SMF initiates a session management policy establishment procedure to a PCF, to obtain a policy corresponding to the session from the PCF. The policy that corresponds to the session and that is returned by the PCF includes the QoS parameter, a charging policy, and the like. The QoS parameter may further include: a 5G QoS Identifier (5QI), an address resolution protocol (ARP), and the like. This QoS parameter is used to indicate a QoS characteristic of a service flow.

The SMF determines, based on the local configuration information and a first QoS parameter, that the first low-latency service flow allows to be established for the session.

Optionally, the SMF determines, based on the local configuration information, that the first low-latency service flow allows to be established for the session. In other words, when the SMF determines, based on the node capability of the RAN and/or the node capability of the UPF, that the session satisfies the condition for establishing the low-latency service flow, the SMF establishes the low-latency service flow for the session.

Optionally, the SMF determines, based on the first QoS parameter, that the first low-latency service flow allows to be established for the session. In other words, when determining, based on the QoS parameter, that the service flow requires a low-latency characteristic, the SMF establishes the low-latency service flow for the session.

In another embodiment, the SMF may alternatively obtain subscription data from a UDM, and determine, based on at least the subscription data, that the terminal apparatus, or a data network name (DNN) and/or single network slice selection assistance information (S-NSSAI) that are/is accessed by the terminal apparatus allows establishing of the first low-latency service flow. The subscription data includes one or more of the following information: an identifier of the terminal apparatus, the DNN, or the S-NSSAI. For example, the UE accesses a data network or S-NSSAI, the SMF obtains the subscription data from the UDM based on the DNN or S-NSSAI accessed by the UE. If the subscription data indicates that the low-latency service flow can be established for the DNN or S-NSSAI accessed by the UE, the SMF determines that the low-latency service flow allows to be established.

S102: The session management network element sends first indication information when the session management network element determines, based on first information, to establish the first low-latency service flow for the session.

Correspondingly, the terminal apparatus receives the first indication information.

The first information includes at least one of the following: the local configuration information, the subscription data, or the first QoS parameter.

When the SMF determines, based on the first information, that the first low-latency service flow can be established for the session, because the low-latency service flow needs to be carried in an always-on session to ensure transmission efficiency of the low-latency service flow, the SMF sends the first indication information. The first indication information is used to indicate to set the session to the always-on session. "Setting" herein may be understood as "establishing" or "modifying". Establishing means establishing a new session; and modifying means modifying a type of the session. Sessions are classified into two types: the always-on session and a non-always-on session. For example, a current session is the non-always-on session, and the session is modified to the always-on session.

Optionally, in an implementation, in a session modification procedure, before S102, the method may further include the following step: The session management network element determines, based on a session context of the session, that the session is the non-always-on session. To be more specific, if the SMF determines that the current session is the non-always-on session, and the SMF determines, based on the first information, to establish the first low-latency service flow for the session, the SMF may send the first indication information, to indicate to modify the session to the always-on session.

Optionally, in another implementation, in a session modification procedure, before S102, the method may further include the following step: The session management network element determines, based on a session context of the session, that the session does not include a second low-latency service flow. To be more specific, if the session management network element determines that there is no other low-latency service flow in the session, it may indicate that the session is not the always-on session, and S102 is performed. For example, the session includes three service flows: a service flow 1, a service flow 2, and a service flow 3. Currently, based on S101 and the first information, the session management network element needs to establish a service flow 4 as a low-latency service flow. The session management network element may first determine whether the service flow 1, the service flow 2, and the service flow 3 are low-latency service flows. If the service flow 1, the service flow 2, and the service flow 3 are non-low-latency service flows, it indicates that the session is not the always-on session, and the session management network element sends the first indication information based on S102. If there is a low-latency service flow in the service flow 1, the service flow 2, and the service flow 3, the session management network element may determine that the session is already the always-on session, and the session management network element does not need to perform S102.

S103: The terminal apparatus sets the session to the always-on session based on the first indication information.

When receiving the first indication information, the UE sets the session to the always-on session based on the first indication information. For example, the UE may save a newly established session as the always-on session, or modify the non-always-on session to the always-on session.

Further, an operator may update the local configuration information of the SMF, the PCF may change the QoS parameter, the UDM may update the subscription data, or the UE may initiate a session modification request. In this case, the method may further include the following steps. These steps are optional and are represented by dashed lines in the figure.

S104: The session management network element obtains updated first information.

The operator may update the local configuration information of the SMF, the PCF may change the QoS parameter, or the UDM may update the subscription data. In this case, the SMF obtains the updated first information. The first information includes at least one of the following: local configuration information, subscription data, or a second QoS parameter.

For example, the PCF initiates a session management policy modification process to the SMF, and sends an updated policy to the SMF. The updated policy may include an updated QoS parameter, such as a 5QI or an ARP.

For another example, the UDM sends a subscription data change notification message to the SMF. Correspondingly, the SMF receives the subscription data change notification message. The subscription data change notification message is used to notify the SMF to allow/reject activating the low-latency service flow for the DNN and the S-NNSAI accessed by the UE.

S104': The terminal apparatus sends the session modification request.

Correspondingly, the session management network element receives the session modification request, in other words, the session management network element obtains the session modification request.

For example, the UE requests to delete the service flow 1 in the session. The service flow 1 is the low-latency service flow.

For another example, the UE requests to change a QoS parameter corresponding to the service 2 in the session from a 5QI 1 to a 5QI 2.

S105: The session management network element determines, based on session context of the session, that the session is the always-on session; and/or the session management network element determines, based on the session context of the session, that the session does not include the second low-latency service flow.

For example, when the SMF determines, based on the updated first information or the session modification request of the terminal apparatus, to delete the first low-latency service flow in the session or modify the first low-latency service flow to a non-low-latency service flow, before the SMF indicates to modify the session to the non-always-on session, the SMF needs to determine, based on the session context of the session, that the current session is the always-on session. If the current session is already the non-always-on session, the SMF does not need to send the indication.

When the SMF determines, based on the updated first information or the session modification request of the terminal apparatus, to delete the first low-latency service flow in the session or modify the first low-latency service flow to the non-low-latency service flow, before the SMF indicates to modify the session to the non-always-on session, the SMF needs to determine that the current session does not include another low-latency service flow. If the session further includes another low-latency service flow, the session cannot be modified to the non-always-on session.

S106: The session management network element sends second indication information when determining, based on the updated first information or the session modification request of the terminal apparatus, to delete the first low-latency service flow in the session or modify the first low-latency service flow to the non-low-latency service flow, where the second indication information is used to indicate to modify the session to the non-always-on session.

Correspondingly, the terminal apparatus receives the second indication information.

For example, when the SMF determines that the current session is the always-on session, and the session does not include another low-latency service flow, the SMF may send the second indication information to indicate to modify the session to the non-always-on session, to avoid a resource waste.

S107: The terminal apparatus sets the session to the non-always-on session based on the second indication information.

The UE modifies the session to the non-always-on session based on the received second indication information.

According to the communications method provided in this embodiment of this application, when determining, based on the local configuration information, the subscription data, and the QoS parameter, to establish the low-latency service flow, the session management network element flexibly indicates the terminal apparatus to set the session to the always-on session or modify the session to the non-always-on session. This avoids a resource waste caused by setting the session to the always-on session all the time, and avoids a transmission latency caused when the session is not set to the always-on session in time, such that resource utilization and transmission efficiency are improved.

Figure 4A:
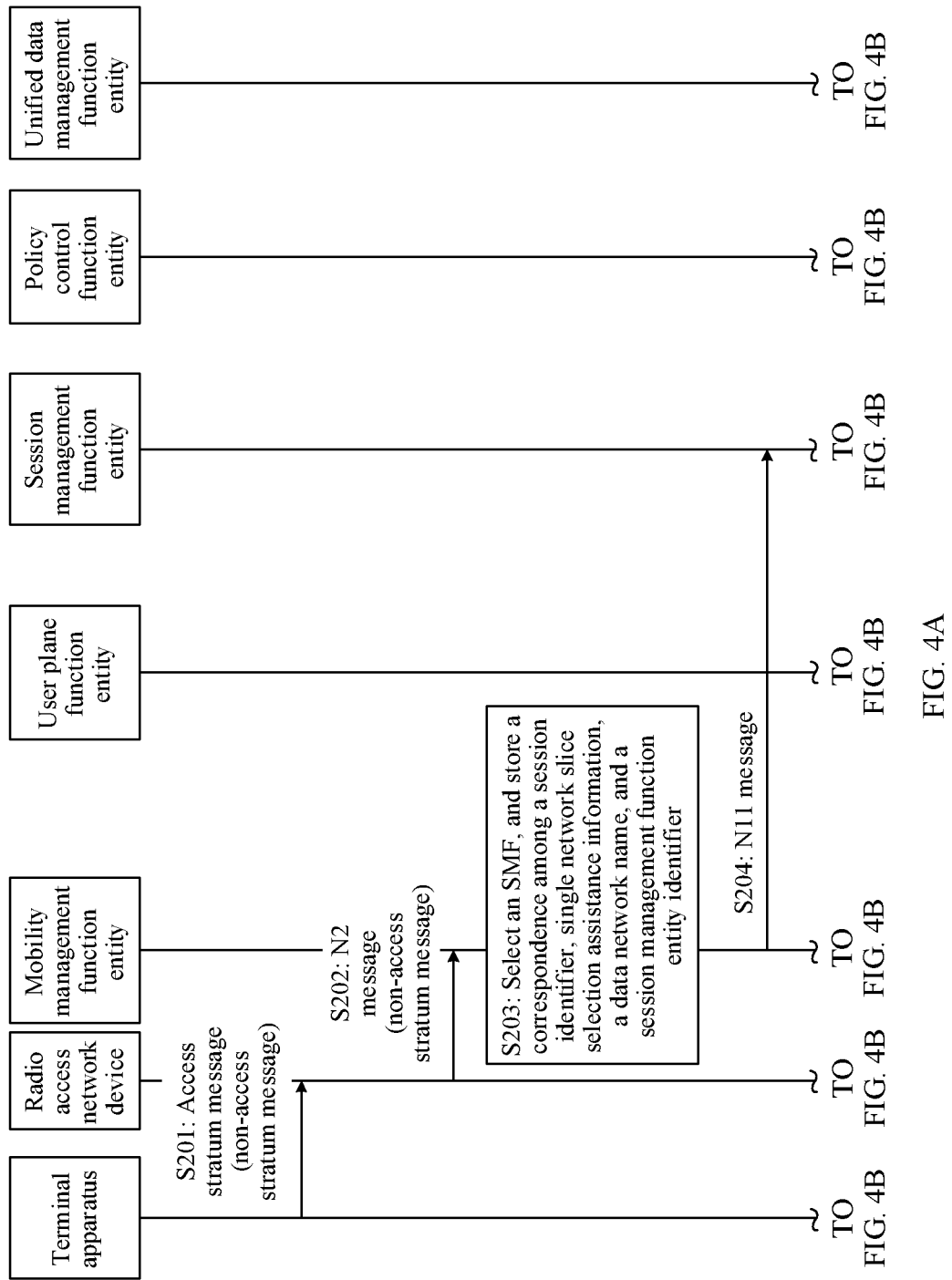
Figure 4B:
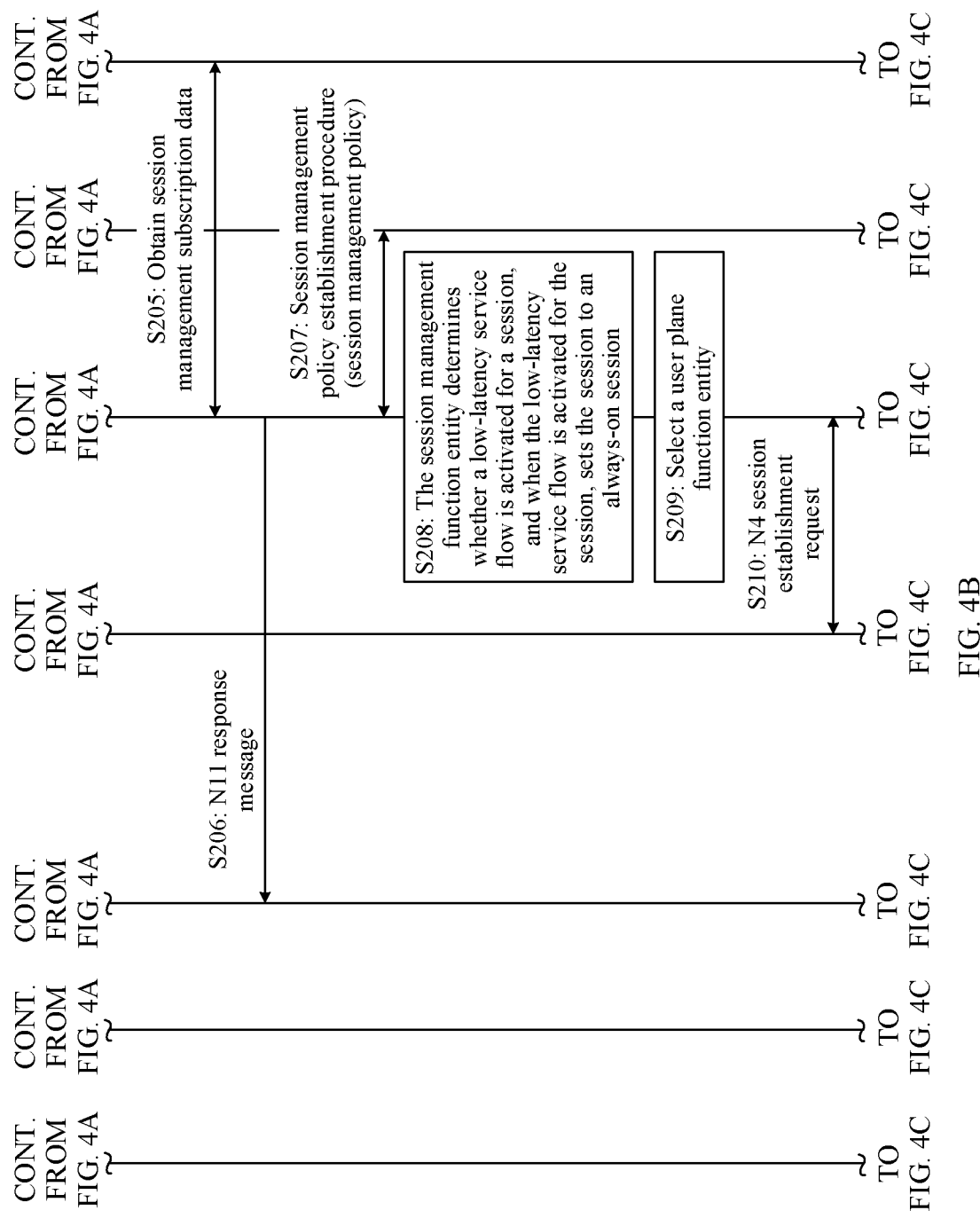

FIG. 4A to FIG. 4C are a schematic interaction flowchart of newly establishing a session as an always-on session according to an embodiment of this application. For example, the method may include the following steps.

S201: UE sends an access stratum (AS) message to a RAN, where the AS message carries a non-access stratum (NAS) message.

Correspondingly, the RAN receives the AS message.

The NAS message includes a protocol data unit session identifier (PDU session ID), a DNN, S-NSSAI, and a session establishment request. The session establishment request carries information such as the session identifier and the DNN. The session establishment request is used to request to establish a new session.

S202: The RAN sends an N2 message to an AMF.

Correspondingly, the AMF receives the N2 message.

The N2 message carries the NAS message in step S201 and a location of the UE.

S203: The AMF selects an SMF based on information such as the DNN and the S-NSSAI, and stores a correspondence among the session identifier, the S-NSSAI, the DNN, and a session management network element identifier (SMF ID).

S204: The AMF sends an N11 message to the SMF.

Correspondingly, the SMF receives the N11 message.

The N11 message carries a UE identifier (for example, the UE identifier is a subscription permanent identifier (SUPI)), the DNN, the S-NSSAI, the location of the UE, and the session establishment request.

This embodiment is described using, as an example, the communications system that is based on the interface-based message shown in FIG. 1. If the communications system is the communications system that is based on the service-oriented interface shown in FIG. 2, alternatively, in S204, the AMF invokes an SMF service message (Nsmf_PDUSession_CreateSMContext Request), where the SMF service message carries the SUPI, the DNN, the S-NSSAI, the location of the UE, and the session establishment request.

S205: The SMF interacts with a UDM to obtain session management subscription data.

For example, the SMF sends a subscription data obtaining request to the UDM, where the subscription data obtaining request carries information such as the UE identifier, the DNN, and the S-NSSAI. If the communications system is based on the service-oriented interface, alternatively, the SMF sends an Nudm_SDM_Get Request to the UDM, where the Nudm_SDM_Get Request carries the information such as the UE identifier, the DNN, and the S-NSSAI.

The UDM returns a subscription data obtaining response and the session management subscription data. The session management subscription data includes whether the DNN and the S-NSSAI accessed by the UE allow a low-latency service to be performed. If the communications system is based on the service-oriented interface, alternatively, the UDM sends an Nudm_SDM_Get Response to the SMF, where the Nudm_SDM_Get Response carries the session management subscription data.

S206: The SMF returns an N11 response message.

The N11 response message is a response to the N11 message in S204.

If the communications system is based on the service-oriented interface, alternatively, the AMF invokes an SMF service Nsmf_PDUSession_CreateSMContext Response.

S207: The SMF initiates a session management policy establishment procedure to a PCF, to obtain a policy corresponding to the session from the PCF.

For example, the policy that corresponds to the session and that is returned by the PCF includes a QoS parameter, a charging policy, and the like. The QoS parameter may further include: a 5QI, an ARP, and the like. This QoS parameter is used to indicate a QoS characteristic of a service flow.

S208: The SMF determines, based on local configuration information, the subscription data, and the QoS parameter, whether a low-latency service flow is activated for the session, and when the SMF determines to activate the low-latency service flow for the session, the SMF sets a status of the session to an always-on PDU session.

The local configuration information includes a node capability of the RAN and/or a node capability of a UPF that are/is configured on the SMF. In an implementation, the SMF may determine, based on the local configuration information and the QoS parameter, that the low-latency service flow allows to be established for the session.

In another implementation, the SMF may determine, based on the subscription data, that the terminal apparatus, or the DNN and/or the S-NSSAI that are/is accessed by the terminal apparatus allows establishing of the low-latency service flow.

In another implementation, the SMF may determine, based on the local configuration information, the QoS parameter, and the subscription data, that the terminal apparatus, or the DNN and/or the S-NSSAI that are/is accessed by the terminal apparatus allows establishing of the low-latency service flow.

It should be noted that, that the SMF determines to activate the low-latency service flow for the session may also be described as that the SMF determines to activate redundant transmission for the session.

S209: The SMF selects a UPF.

S210: The SMF sends an N4 session establishment request to the UPF.

Correspondingly, the UPF receives the N4 session establishment request.

The N4 session establishment request carries an uplink forwarding rule. The uplink forwarding rule is used to indicate the UPF to process an uplink packet according to the rule. The uplink forwarding rule includes an N4 session identifier (N4 session ID), packet detection information, and the like.

Then, the UPF returns an N4 session establishment response to the SMF.

Correspondingly, the SMF receives the N4 session establishment response.

The N4 session establishment response carries core network (CN) tunnel information (CN Tunnel Info). For a URLLC service, the UPF returns two pieces of core network tunnel information: CN tunnel info 1 and CN tunnel info 2.

S211: The SMF sends an N11 message to the AMF.

Correspondingly, the AMF receives the N11 message.

The N11 message carries the session identifier, N2 SM info, and N1 SM info.

The N2 SM info includes parameters such as CN Tunnel Info, a quality of service (QoS) flow identifier (QFI), and the 5QI.

The N1 SM info includes a session establishment accept. The session establishment accept includes the 5QI and indication information (which is used to indicate to set the session to the always-on PDU session).

If the communications system is based on the service-oriented interface, alternatively, the SMF invokes an AMF service Namf_Communication_NIN2MessageTransfer request.

Then, the AMF returns an N11 response message to the SMF.

Correspondingly, the SMF receives the N11 response message.

S212: The AMF sends an N2 session request to the RAN.

Correspondingly, the RAN receives the N2 session request.

The N2 session request carries a NAS message and N2 SM info.

The NAS message includes the session identifier and N1 SM info.

S213: The RAN initiates a process of establishing a wireless connection to the UE.

In this process, the RAN sends the NAS message to the UE.

S214: The UE saves the session as the always-on PDU session based on the received session establishment accept.

S215: The RAN returns an N2 session response to the AMF.

Correspondingly, the AMF receives the N2 session response.

The N2 session response carries the session identifier and N2 SM info.

The N2 SM info carries access network tunnel information (AN tunnel info). For the URLLC service, the AN tunnel info includes two pieces of access network tunnel information: AN tunnel info 1 and AN tunnel info 2.

S216: The SMF updates a user plane connection between the RAN and the UPF.

For example, the AMF sends an N11 message to the SMF. Correspondingly, the SMF receives the N11 message.

The N11 message carries the N2 SM Info in S215.

If the communications system is based on the service-oriented interface, alternatively, the AMF invokes an SMF service Nsmf_PDUSession_UpdateSMContext Request.

Then, the SMF sends an N4 session modification request to the UPF. The N4 session modification request carries a downlink forwarding rule and the AN Tunnel Info. The downlink forwarding rule is used to indicate the UPF to process a downlink packet according to the rule. The downlink forwarding rule includes the N4 session ID, packet detection information, and the like.

After receiving the N4 session modification request, the UPF returns an N4 session modification response to the SMF.

After receiving the N4 session modification response, the SMF returns an N11 ACK message to the AMF. If the communications system is based on the service-oriented interface, alternatively, the AMF invokes an SMF service Nsmf_PDUSession_UpdateSMContext Response.

Figure 5A:
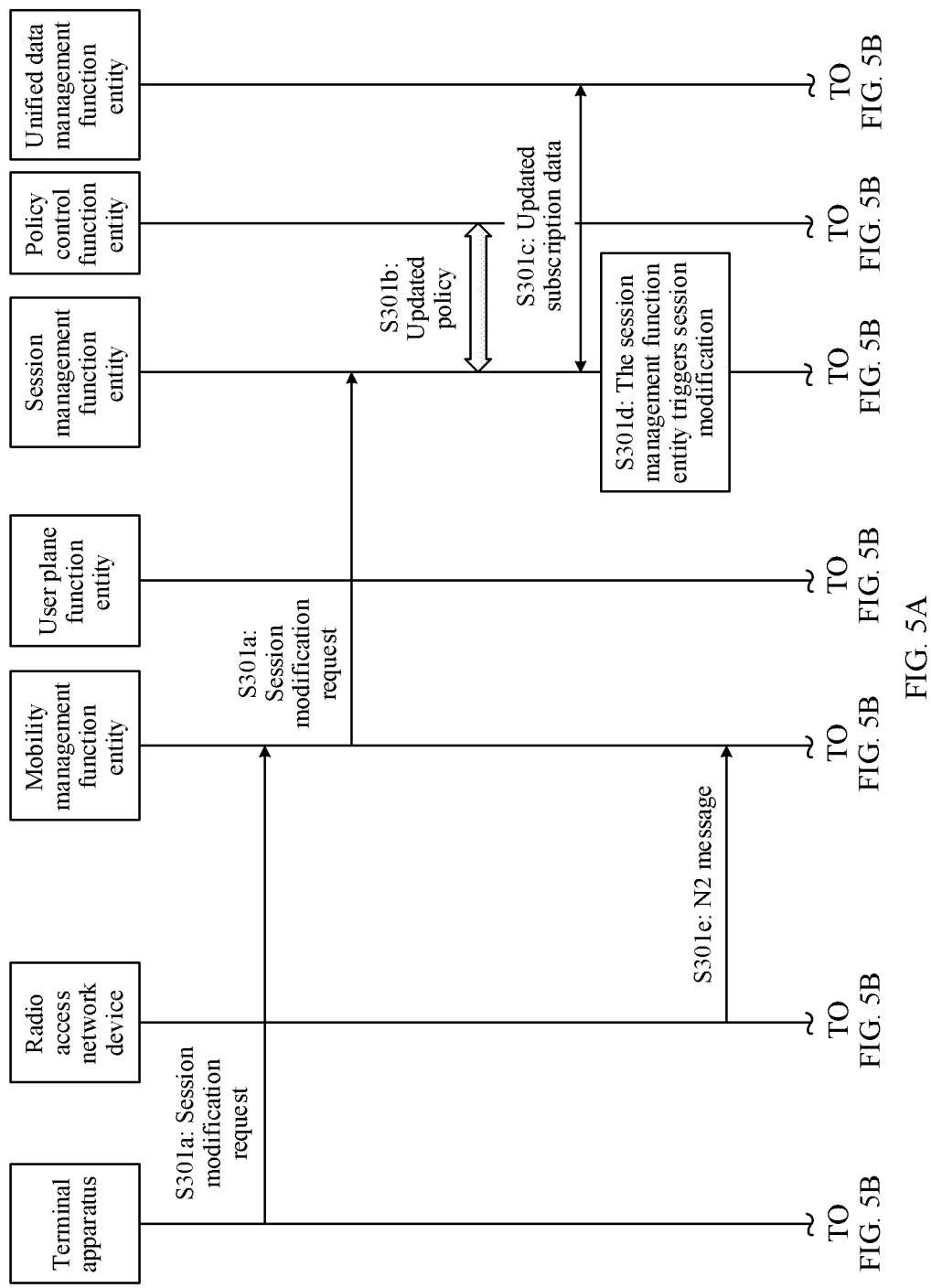
Figure 5B:
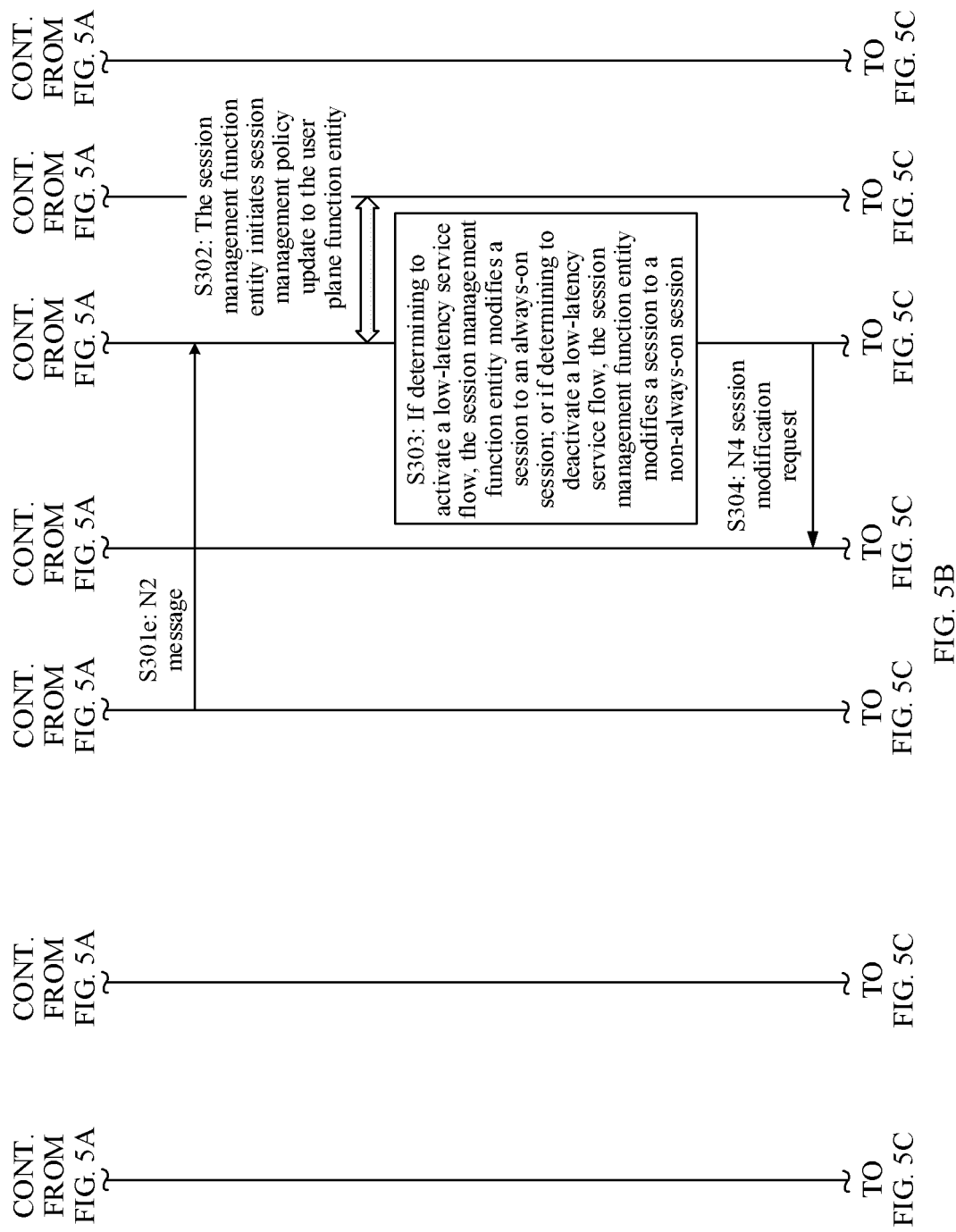

FIG. 5A to FIG. 5C are a schematic interaction flowchart of session modification according to an embodiment of this application. For example, the method may include the following steps.

Trigger conditions of a session modification procedure may be as follows:

S301a: UE sends a session modification request (e.g., PDU session modification request).

For example, the UE sends the session modification request to an AMF through a RAN. Correspondingly, the AMF receives the session modification request.

The session modification request carries a session identifier, a packet filter, a requested QoS parameter, an operation type, and the like. The session identifier is used to identify a session. The packet filter is used to identify a service. The requested QoS parameter is used to identify a QoS parameter expected by the UE. The operation type may be deletion, addition, or modification.

1: For example, the UE requests to delete a service 1 in the session. A service flow 1 corresponding to the service is a low-latency service flow.

2: For example, the UE requests to change a QoS parameter corresponding to a service 2 in the session from a 5QI 1 to a 5QI 2.

3: For example, the UE requests to add a service 3 to the session.

Then, the AMF sends an N11 message to an SMF. Correspondingly, the SMF receives the N11 message.

If the communications system is a system that is based on a service-oriented interface, the N11 message corresponds to an Nsmf_PDUSession_UpdateSMContext request on the service-oriented interface, and the Nsmf_PDUSession_UpdateSMContext request carries the session modification request.

S301b: A PCF initiates session modification.

For example, the PCF initiates a session management policy modification process to the SMF, and sends an updated policy to the SMF. The updated policy may include an updated QoS parameter, such as a 5QI or an ARP.

The SMF receives the updated policy.

S301c: A UDM initiates session modification.

For example, the UDM sends a subscription data change notification message to the SMF. Correspondingly, the SMF receives the subscription data change notification message. The subscription data change notification message carries updated subscription data. The subscription data change notification message corresponds to Nudm_SDM_Notification on the service-oriented interface.

For example, the subscription data change notification message is used to notify the SMF to allow/reject activating the low-latency service flow for a DNN and S-NNSAI accessed by the UE.

S301d: The SMF initiates session modification.

For example, the SMF initiates the session modification procedure because local configuration information is changed, a target radio access network device (target RAN) does not accept the low-latency service flow in a handover procedure, or the low-latency service flow is released in an access network release (AN release) procedure.

S301e: The RAN initiates session modification.

For example, the RAN sends an N2 message to the AMF. Correspondingly, the AMF receives the N2 message.

The N2 message carries the session identifier and N2 SM info. The N2 SM info carries information such as a QFI, a location of the UE, and an indication. The QFI is used to identify a service flow. The indication is used to indicate that a service flow corresponding to the QFI is released, or indicate that the RAN cannot satisfy a QoS requirement corresponding to the service flow.

Then, the AMF sends an N11 message to the SMF. Correspondingly, the SMF receives the N11 message.

The N11 message carries N2 SM info. The N11 message corresponds to an Nsmf_PDUSession_UpdateSMContext request on the service-oriented interface.

S302: The SMF initiates a session management policy update process to the PCF, to obtain latest policy information from the PCF.

This step is optional. If the session modification procedure is triggered by the PCF, this step may not be performed.

S303: Based on steps S301a to S301e, optionally, further based on S302, when the SMF determines to activate/deactivate the low-latency service flow for the session, and the SMF changes a session status to an always-on PDU session/a non-always-on PDU session.

For example, when the SMF determines to activate the low-latency service flow and the session status is the non-always-on PDU session, the SMF modifies the session status to the always-on PDU session. On the contrary, when the SMF determines to deactivate the low-latency service flow and there is no other low-latency service in the session, that is, the session is the non-always-on session, the SMF modifies the session status to the non-always-on PDU session.

It should be noted that, that the SMF determines to activate or deactivate the low-latency service flow may also be described as that the SMF determines to activate or deactivate redundant transmission.

1: For example, when the SMF determines that a service that the UE requests to delete corresponds to a low-latency service flow, the SMF determines to deactivate the low-latency service. If there is no other low-latency service flow in the session, the SMF modifies the session to the non-always-on PDU session.

2: For example, when the SMF determines that the PCF modifies the service to the low-latency service flow, the SMF determines to activate the low-latency service flow. If the session is not the always-on PDU session, that is, the session is the non-always-on PDU session, the SMF modifies the session to the always-on PDU session.

3: For example, when the SMF determines that the UDM rejects the session or the UE activates the low-latency service flow, and that the low-latency service flow is already activated for the session, the SMF determines to deactivate the low-latency service flow. Further, the SMF modifies the session to the non-always-on PDU session.

4: For example, in the handover procedure, the target RAN does not accept the low-latency service flow, and triggers the SMF to deactivate the low-latency service flow. Further, the SMF modifies the session to the non-always-on PDU session.

5: For example, when the SMF determines that the RAN cannot satisfy the low-latency service flow, the SMF deactivates the low-latency service flow. Further, the SMF modifies the session to the non-always-on PDU session.

S304: The SMF initiates an N4 session modification procedure to a UPF, to update user plane information on the UPF.

For example, the SMF sends an N4 session modification request to the UPF, and the N4 session modification request carries an N4 session identifier.

S305: After receiving the N4 session modification request, the UPF returns an N4 session modification response message to the SMF. The N4 session modification response message carries updated CN tunnel info.

S306: For the session modification procedure initiated by the UE or the AN, the SMF returns an N11 response message to the AMF. Correspondingly, the AMF receives the N11 response message. The N11 response message carries N2 SM info and N1 SM info. The N11 response message corresponds to an Nsmf_PDUSession_UpdateSMContext response on the service-oriented interface.

For a session modification procedure triggered by another network element, the SMF returns an N11 message to the AMF, and the AMF receives the N11 message. The N11 message corresponds to Namf_Communication_ N1N2MessageTransfer on the service-oriented interface. The N11 message carries N2 SM info and N1 SM info.

The N2 SM info includes the session identifier, the QFI, the CN tunnel info, and the like. The N1 SM info includes the session modification request, and the session modification request includes the session identifier and the indication information. The indication information is used to indicate that the session is the always-on PDU session or the non-always-on PDU session.

S307: The SMF sends an N2 session modification request to the AMF.

Correspondingly, the AMF sends an N2 session modification response to the SMF.

Then, the AMF sends the N2 session modification request to the UE.

Correspondingly, the RAN receives the N2 session modification request.

The N2 session modification request carries a NAS message. The NAS message includes the session modification request in step 304.

S308: Optionally, the RAN initiates a wireless connection configuration process. In this process, the RAN sends the NAS message to the UE.

Correspondingly, the UE receives the NAS message.

S309: The UE modifies the session to the always-on PDU session or the non-always-on PDU session based on the received session modification request.

S310: Another step of session modification, for example, update a user plane connection between the RAN and the UPF. Reference may be made to step S216 in the embodiment shown in FIG. 4C.

This embodiment describes the session modification procedure initiated by the SMF, the UE, or another core network element. The SMF may flexibly set the session to the always-on session or the non-always-on session based on the local configuration information, the QoS parameter, the subscription data, or the session modification request of the UE. This avoids a resource waste caused by setting the session to the always-on session all the time, and avoids a transmission latency caused when the session is not set to the always-on session in time, such that resource utilization and transmission efficiency are improved.

Figure 6:
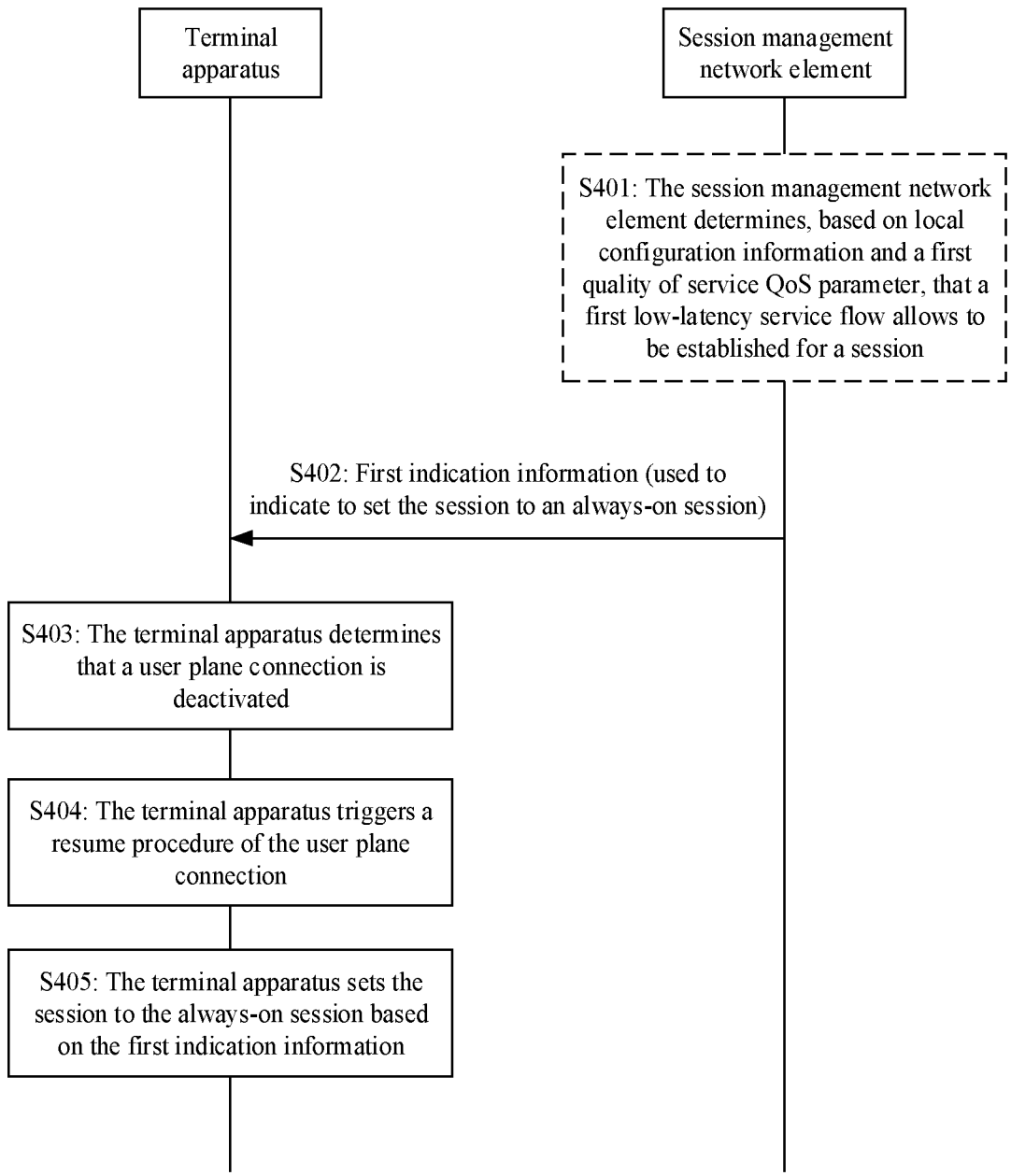
FIG. 6 is a schematic interaction flowchart of another communications method according to an embodiment of this application.

FIG. 6 is a schematic interaction flowchart of another communications method according to an embodiment of this application. For example, the method may include the following steps.

S401: A session management network element determines, based on local configuration information and a first QoS parameter, that a first low-latency service flow allows to be established for a session, where the local configuration information includes a node capability of a radio access network device and/or a node capability of a user plane function network element.

In another embodiment, the session management network element may further determine, based on the subscription data, that a terminal apparatus allows establishing of the first low-latency service flow, or a data network name (DNN) and/or single network slice selection assistance information (S-NSSAI) that are/is accessed by the terminal apparatus allows establishing of the first low-latency service flow, where the subscription data includes one or more of the following information: an identifier of the terminal apparatus, the DNN, or the S-NSSAI.

For implementation of this step, refer to step S101 in the embodiment shown in FIG. 3.

S402: The session management network element sends first indication information when the session management network element determines, based on first information, to establish the first low-latency service flow for the session, where the first information includes at least one of the following: the local configuration information, the subscription data, or the first QoS parameter; and where the first indication information is used to set the session to an always-on session.

Correspondingly, the terminal apparatus receives the first indication information.

For implementation of this step, refer to step S102 in the embodiment shown in FIG. 3.

S403: The terminal apparatus determines that a user plane connection is deactivated (user plane connections of the UE to be deactivated).

It should be noted that, that the user plane connection is deactivated indicates that an air interface connection between the terminal apparatus and the radio access device and an N3 connection between the radio access device and the user plane function entity are disconnected.

S404: The terminal apparatus triggers a resume procedure of the user plane connection.

For the always-on session, the terminal apparatus is required to activate the user plane connection when changing from an idle state to a connected state. Before the terminal apparatus receives the first indication information and sets the session to the always-on session, when the terminal apparatus determines that the user plane connection of the session is in a disconnected state or is deactivated, the terminal apparatus may trigger a service request procedure, to activate the user plane connection corresponding to the session. For example, the terminal apparatus may determine a status of the user plane connection of the session based on a session context of the session, for example, a QoS parameter. If the session context of the session exists, the terminal apparatus may determine that the user plane connection of the session is in a connected state. If the session context of the session does not exist, the terminal apparatus may determine that the user plane connection of the session is in the disconnected state.

For example, in the embodiment shown in FIG. 5A to FIG. 5C, in step S308, if the UE modifies the session to the always-on PDU session, but the UE determines that the user plane connection of the session is in the disconnected state, the UE triggers the service request procedure, to activate the user plane connection corresponding to the session. For example, the UE may determine the status of the user plane connection of the session based on the context corresponding to the session, for example, the QoS parameter. If the context corresponding to the session exists, the UE determines that the user plane connection of the session is in the connected state; or if no context corresponding to the session exists, the UE determines that the user plane connection of the session is in the disconnected state.

It should be noted that the service request procedure triggered by the UE is performed after the session modification procedure shown in FIG. 5C. To be more specific, after the session modification procedure shown in FIG. 5C is completed, the UE triggers the service request procedure to resume the user plane connection of the session.

It should be noted that when step S308 needs to be performed, the method is only applicable to the following scenario: A PCF or a UDM initiates session modification, and the user plane connection of the to-be-modified session is deactivated (that is, the user plane connection is disconnected, to be more specific, the wireless connection and the N3 connection do not exist). In this case, steps S304 and S305 do not need to be performed, and step S306 does not include N2 SM info.

It should be noted that, in the scenario in which the PCF or the UDM triggers session modification, and the user plane connection of the to-be-modified session is deactivated (that is, disconnected), alternatively, an SMF may initiate a user plane connection establishment process. The SMF can determine the status of the user plane connection based on the stored session context, such as AN tunnel info. When there is no related session context on the SMF, for example, there is no information about the user plane connection on the SMF, the SMF determines that the user plane connection is disconnected; or when there is related session context, the SMF determines that the user plane connection is connected. In this case, step S404 does not need to be performed. Step 303 may be replaced by the following step: When determining to modify the session to the always-on PDU session, the SMF further determines whether the user plane connection of the session is activated, in other words, whether the user plane connection is disconnected. If the user plane connection is disconnected, the SMF further triggers resuming of the user plane connection, that is, performs steps S304 to S310, where step S305 includes N2 SM info; otherwise, the SMF performs the session modification procedure normally. Descriptions of other steps are the same as those of steps S302 to S308.

S405: The terminal apparatus sets the session to the always-on session based on the first indication information.

It should be noted that there is no sequence between steps S403 and S404, and step S405.

According to the communications method provided in this embodiment of this application, when receiving the indication for setting the session to the always-on session, the terminal device needs to determine that the user plane connection is activated. If the user plane connection is deactivated, the terminal device triggers the resume procedure of the user plane connection to resume the user plane connection, and then, sets the session to the always-on session, to ensure that the always-on session is set reliably.

In another embodiment, alternatively, an application function (AF) network element may send an AF request to the PCF, where the application function request carries service information and indication information, and where the indication information is used to indicate that the AF requires a service corresponding to the service information to be carried on the always-on session, that is, requires a session corresponding to the service to be the always-on session. The PCF generates PCC rules based on the AF request, where the PCC rules carry the foregoing indication information. The SMF receives the indication information, and forwards the indication information to the UE. The UE sets the session to the always-on session based on the indication information.

Figure 7:
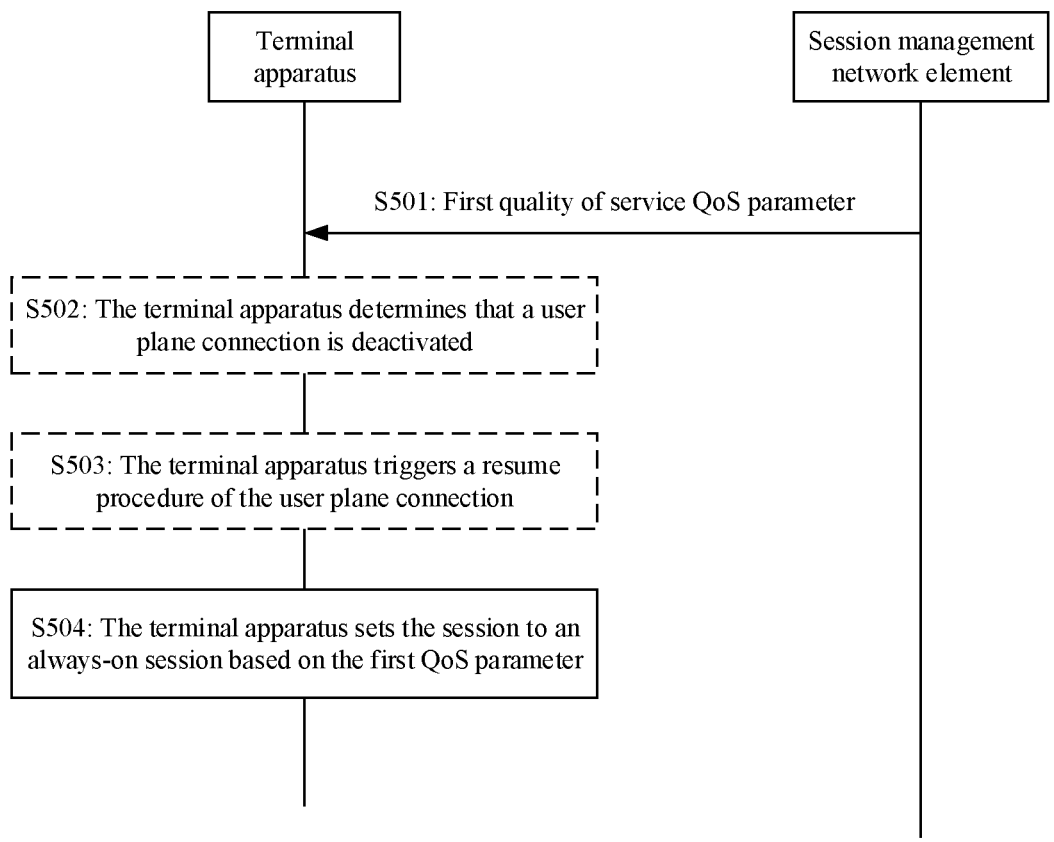
FIG. 7 is a schematic interaction flowchart of another communications method according to an embodiment of this application.
Figure 8A:
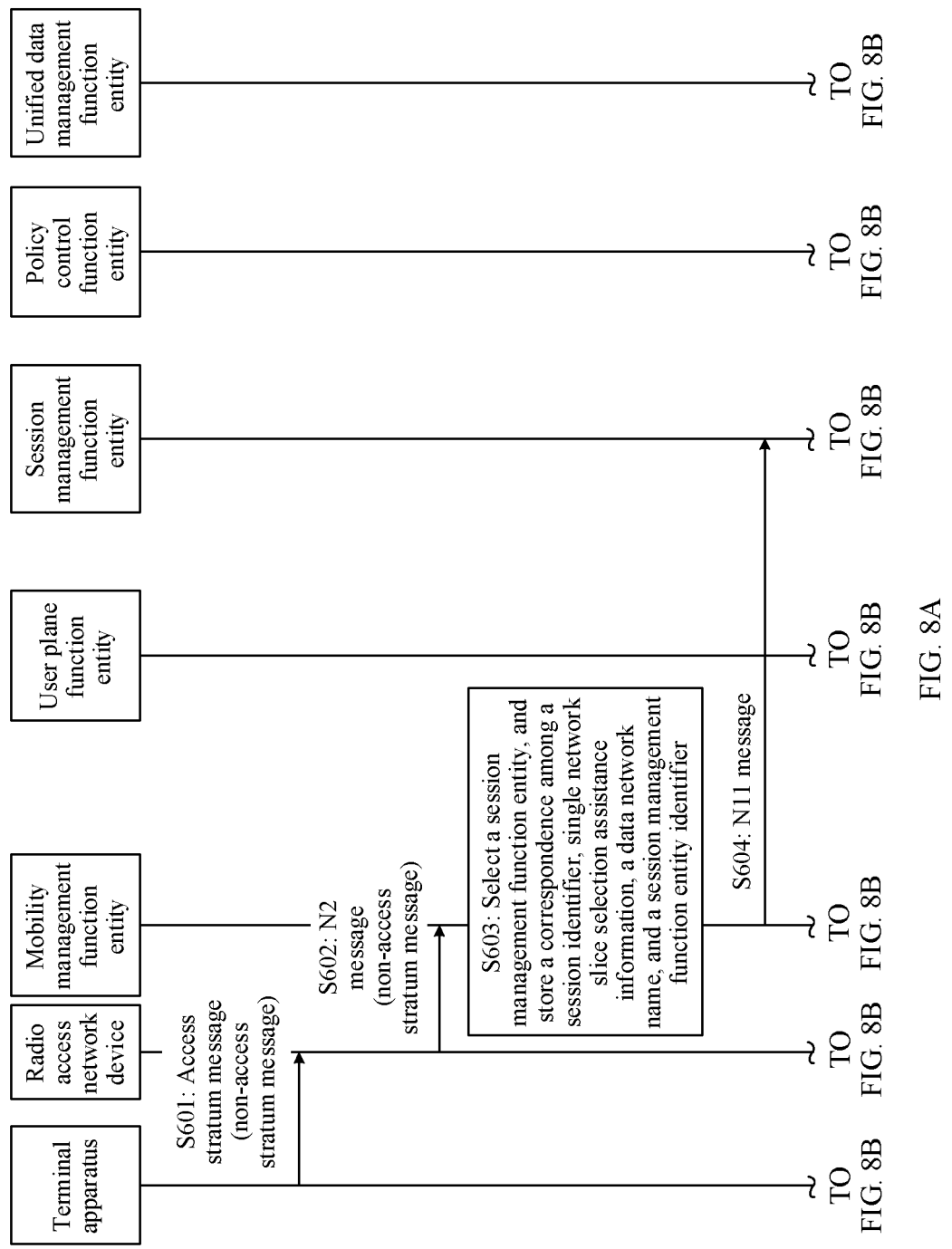
Figure 8B:
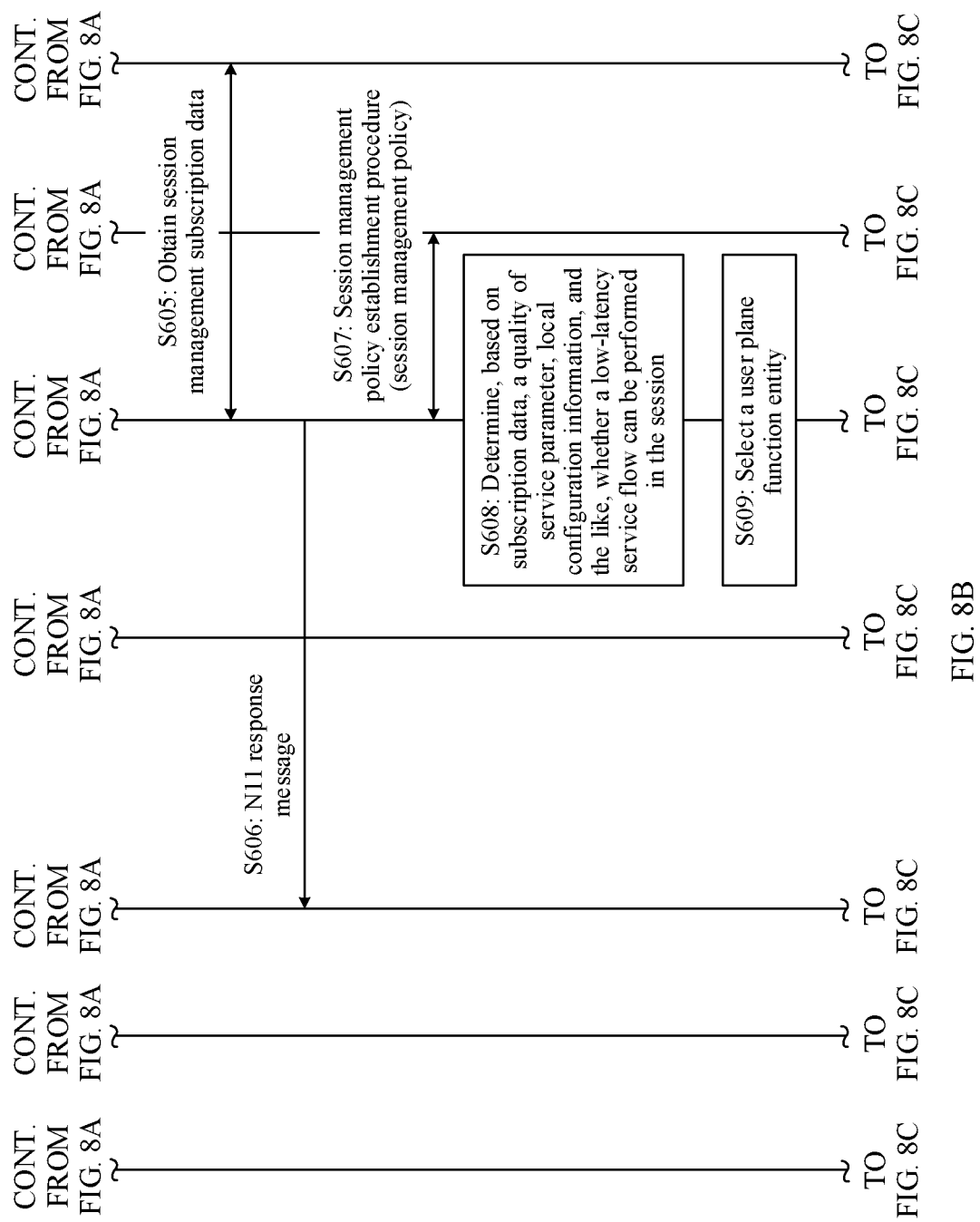
Figure 8C:
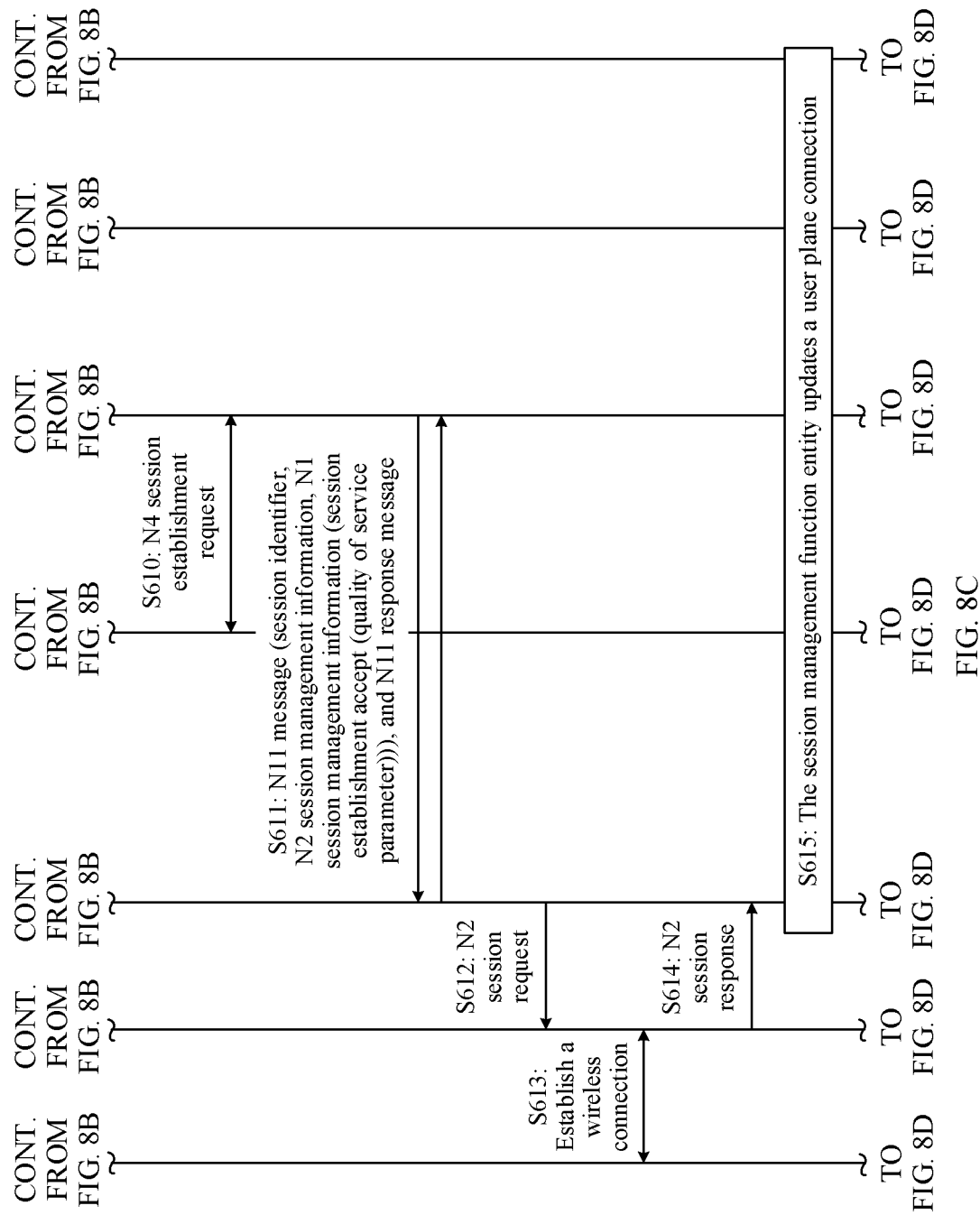
Figure 8D:
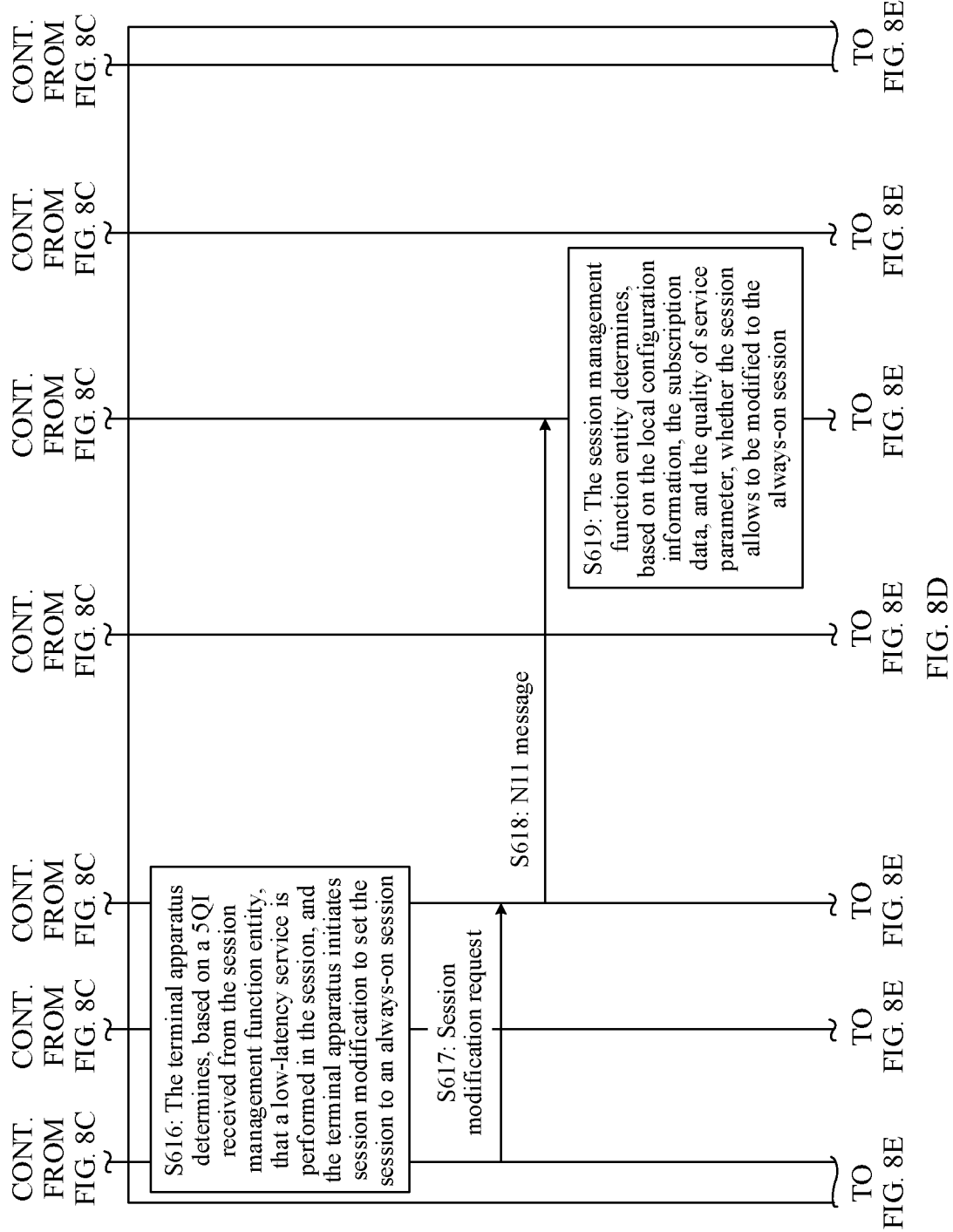

FIG. 7 is a schematic interaction flowchart of another communications method according to an embodiment of this application. For example, the method may include the following steps.

S501: A session management network element sends a first QoS parameter.

Correspondingly, a terminal apparatus receives the first QoS parameter.

For example, the session management network element sends the first QoS parameter to the terminal apparatus through a UPF, an AMF, a RAN, and the like. The first QoS parameter is used to indicate a QoS characteristic of a service flow. The first QoS parameter includes parameters such as an authorized 5QI and an ARP. The authorized 5QI may correspond to a parameter such as a packet loss rate or a latency.

After receiving the first QoS parameter, the terminal apparatus may perceive that a current session includes a low-latency service flow, and the terminal apparatus determines, based on the first QoS parameter, to set the current session to an always-on session.

For example, the terminal apparatus stores a correspondence between the first QoS parameter and the low-latency service flow. When receiving the first QoS parameter, the terminal apparatus may determine, based on the correspondence, that the current session includes the low-latency service flow, and the terminal apparatus determines, based on the first QoS parameter, that the current session needs to be set to the always-on session.

S502: The terminal apparatus determines that a user plane connection is deactivated.

S503: The terminal apparatus triggers a resume procedure of the user plane connection.

S502 and S503 are optional steps and are represented by dashed lines in the figure. For the always-on session, the terminal apparatus is required to activate the user plane connection when changing from an idle state to a connected state. Before the terminal apparatus receives the first QoS parameter and sets the session to the always-on session, when the terminal apparatus determines that the user plane connection of the session is in a disconnected state or is deactivated, the terminal device may trigger a service request procedure, to activate the user plane connection corresponding to the session. For example, the terminal apparatus triggers the resume procedure of the user plane connection, to resume the user plane connection. For example, the terminal apparatus may determine a status of the user plane connection of the session based on a session context of the session, for example, a QoS parameter. If the session context of the session exists, the terminal apparatus may determine that the user plane connection of the session is in a connected state. If the session context of the session does not exist, the terminal apparatus may determine that the user plane connection of the session is in the disconnected state.

If determining that the user plane connection is activated, the terminal apparatus may not perform S502 and S503, and directly performs S504.

S504: The terminal apparatus sets the session to the always-on session based on the first QoS parameter.

The terminal apparatus sets the session to the always-on session when the terminal apparatus determines that the user plane connection is in the connected state, or determines that the user plane connection is in the disconnected state, but already resumes the user plane connection by triggering the resume procedure of the user plane connection.

For example, that the terminal apparatus sets the session to the always-on session includes: The terminal apparatus initiates a session modification procedure to the session management function network element, where the terminal apparatus carries an always-on session request indication; and when the terminal apparatus receives an indication that is sent by the session management function network element and that indicates that the session allows to be modified to the always-on session, the terminal apparatus sets the current session to the always-on session.

According to the communications method provided in this embodiment of this application, the terminal device may perceive, based on the received QoS parameter, that the current service flow is the low-latency service flow, and therefore set the session to the always-on session based on the QoS parameter. In this way, the always-on session is flexibly set. This avoids a resource waste caused by setting the session to the always-on session all the time, and avoids a transmission latency caused when the session is not set to the always-on session in time, such that resource utilization and transmission efficiency are improved. Before setting the session to the always-on session, the terminal apparatus needs to determine that the user plane connection is activated. If the user plane connection is deactivated, the terminal apparatus triggers the resume procedure of the user plane connection to resume the user plane connection, and then sets the session to the always-on session, to ensure that the always-on session is set reliably.

FIG. 8A to FIG. 8E are a schematic interaction flowchart of session establishment and modification performed by a terminal apparatus according to an embodiment of this application. For example, the method may include the following steps.

S601: UE sends an access stratum message to a RAN, where the AS message carries a non-access stratum message.

Correspondingly, the RAN receives the AS message.

The NAS message includes a protocol data unit session identifier, a DNN, S-NSSAI, and a session establishment request. The session establishment request carries information such as the session identifier and the DNN. The session establishment request is used to request to establish a new session.

S602: The RAN sends an N2 message to the AMF.

Correspondingly, the AMF receives the N2 message.

The N2 message carries the NAS message in step S601 and a location of the UE.

S603: The AMF selects an SMF based on information such as the DNN and the S-NSSAI, and stores a correspondence among the session identifier, the S-NSSAI, the DNN, and a session management network element identifier (SMF ID).

S604: The AMF sends an N11 message to the SMF.

Correspondingly, the SMF receives the N11 message.

The N11 message carries a UE identifier (for example, the UE identifier is a subscription permanent identifier (SUPI)), the DNN, the S-NSSAI, the location of the UE, and the session establishment request.

This embodiment is described using, as an example, the communications system that is based on the interface-based message shown in FIG. 1. If the communications system is the communications system that is based on the service-oriented interface shown in FIG. 2, alternatively, in S604, the AMF invokes an SMF service message (Nsmf_PDUSession_CreateSMContext Request), where the SMF service message carries the SUPI, the DNN, the S-NSSAI, the location of the UE, and the session establishment request.

S605: The SMF interacts with a UDM to obtain session management subscription data.

For example, the SMF sends a subscription data obtaining request to the UDM, where the subscription data obtaining request carries information such as the UE identifier, the DNN, and the S-NSSAI. If the communications system is based on the service-oriented interface, alternatively, the SMF sends an Nudm_SDM_Get Request to the UDM, where the Nudm_SDM_Get Request carries information such as the UE identifier, the DNN, and the S-NSSAI.

The UDM returns a subscription data obtaining response and the session management subscription data. The session management subscription data includes whether the DNN and the S-NSSAI accessed by the UE allow a low-latency service to be performed. If the communications system is based on the service-oriented interface, alternatively, the UDM sends an Nudm_SDM_Get Response to the SMF, where the Nudm_SDM_Get Response carries the session management subscription data.

S606: The SMF returns an N11 response message.

The N11 response message is a response to the N11 message in S604.

If the communications system is based on the service-oriented interface, alternatively, the AMF invokes an SMF service Nsmf_PDUSession_CreateSMContext Response.

S607: The SMF initiates a session management policy establishment procedure to a PCF, to obtain a policy corresponding to the session from the PCF.

For example, the policy that corresponds to the session and that is returned by the PCF includes a QoS parameter, a charging policy, and the like. The QoS parameter may further include: a 5QI, an ARP, and the like. This QoS parameter is used to indicate a QoS characteristic of a service flow.

S608: The SMF determines, based on local configuration information, the subscription data, and the QoS parameter, whether a low-latency service flow is activated for the session.

The local configuration information includes a node capability of the RAN and/or a node capability of a UPF that are/is configured on the SMF. In an implementation, the SMF may determine, based on the local configuration information and the QoS parameter, that the low-latency service flow allows to be established for the session.

In another implementation, the SMF may determine, based on the subscription data, that the terminal apparatus, or the DNN and/or the S-NSSAI that are/is accessed by the terminal apparatus allows establishing of the low-latency service flow.

In another implementation, the SMF may determine, based on the local configuration information, the QoS parameter, and the subscription data, that the terminal apparatus, or the DNN and/or the S-NSSAI that are/is accessed by the terminal apparatus allows establishing of the low-latency service flow.

The step S608 in this embodiment is different from step S208 in the embodiment shown in FIG. 4B in that, in this embodiment, the SMF does not set the session to the always-on session.

S609: The SMF selects a UPF.

S610: The SMF sends an N4 session establishment request to the UPF.

Correspondingly, the UPF receives the N4 session establishment request.

The N4 session establishment request carries an uplink forwarding rule. The uplink forwarding rule is used to indicate the UPF to process an uplink packet according to the rule. The uplink forwarding rule includes an N4 session ID, packet detection information, and the like.

Then, the UPF returns an N4 session establishment response to the SMF.

Correspondingly, the SMF receives the N4 session establishment response.

The N4 session establishment response carries core network tunnel information (CN Tunnel Info). For a URLLC service, the UPF returns two pieces of core network tunnel information: CN tunnel info 1 and CN tunnel info 2.

S611: The SMF sends an N11 message to the AMF.

Correspondingly, the AMF receives the N11 message.

The N11 message carries the session identifier, N2 SM info, and N1 SM info.

The N2 SM info includes parameters such as the CN Tunnel Info, a QFI, and the 5QI.

The N1 SM info includes a session establishment accept. The session establishment accept includes the 5QI.

If the communications system is based on the service-oriented interface, alternatively, the SMF invokes an AMF service Namf_Communication_NIN2MessageTransfer request.

Then, the AMF returns an N11 response message to the SMF.

Correspondingly, the SMF receives the N11 response message.

The step S611 in this embodiment is different from step S211 in the embodiment shown in FIG. 4C in that the session establishment accept does not include indication information used to indicate the UE to set the session to the always-on session.

S612: The AMF sends an N2 session request to the RAN.

Correspondingly, the RAN receives the N2 session request.

The N2 session request carries a NAS message and N2 SM info.

The NAS message includes the session identifier and N1 SM info.

S613: The RAN initiates a process of establishing a wireless connection to the UE.

In this process, the RAN sends the NAS message to the UE.

S614: The RAN returns an N2 session response to the AMF.

Correspondingly, the AMF receives the N2 session response.

The N2 session response carries the session identifier and N2 SM info.

The N2 SM info carries access network tunnel information (AN tunnel info). For the URLLC service, the AN tunnel info includes two pieces of access network tunnel information: AN tunnel info 1 and AN tunnel info 2.

S615: The SMF updates a user plane connection between the RAN and the UPF.

For details, refer to step S216 in the embodiment shown in FIG. 4C.

S616: The UE determines, based on the QoS parameter, such as the 5QI, received from the SMF, that the low-latency service flow is activated for the session, and the UE triggers a session modification procedure, to set the session to the always-on PDU session.

S617: The UE sends a session modification request to the AMF through the RAN.

Correspondingly, the AMF receives the session modification request.

The session modification request carries the session identifier. The session modification request (always-on PDU session requested) is used to request to modify the session to the always-on session.

S618: The AMF sends an N11 message to the SMF.

Correspondingly, the SMF receives the N11 message.

The N11 message is used to request to update the session context of the session, and carries the session modification request.

S619: The SMF determines, based on the local configuration information, the subscription data, and the QoS parameter, whether the session allows to be modified to the always-on session.

For details, refer to step S608.

In addition, the SMF may alternatively learn of, based on S608, whether the low-latency service flow is activated for the session, to determine whether the session allows to be modified to the always-on session.

S620: The SMF sends an N11 response message to the AMF.

Correspondingly, the AMF receives the N11 response message.

The N11 response message carries N1 SM info. The N1 SM info includes a session modification command. The session modification command includes the session identifier and indication information (e.g., always-on PDU session granted indication). The indication information is used to indicate whether the session allows to be modified to the always-on PDU session.

S621: The AMF sends the session modification command to the UE through the RAN.

S622 and S623: The UE sends a session modification command response to the AMF through the RAN.

S624: The AMF sends an N11 message to the SMF.

Correspondingly, the SMF receives the N11 message.

The N11 message carries the session modification command response.

S625: The SMF returns an N11 response message to the AMF.

Correspondingly, the AFM receives the N11 response message.

This embodiment describes a detailed procedure in which the UE initiates session establishment and modification. A difference between this embodiment and other embodiments is that in this embodiment, when the UE initiates the session establishment procedure, the SMF only determines whether the low-latency service flow is activated, and sends the QoS parameter to the terminal device. The UE may perceive, based on the QoS parameter, that the low-latency service flow exists in the session, and therefore set the session to the always-on session. When the UE initiates the session modification procedure, the UE receives the information that is sent by the SMF and that indicates that the session allows to be modified to the always-on session, and modifies the session to the always-on session.

The foregoing describes in detail the methods in the embodiments of this application. The following provides an apparatus in the embodiments of this application.

Figure 9:
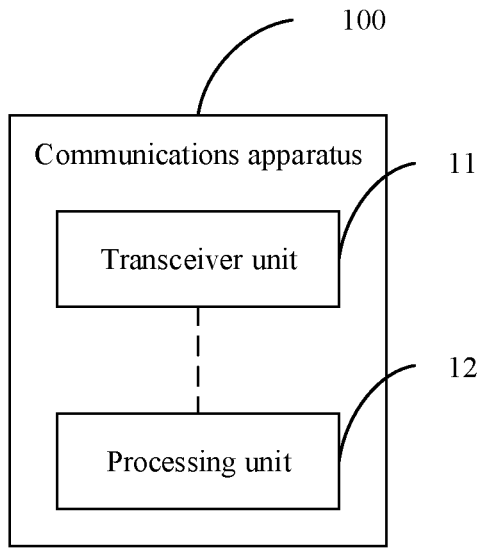
FIG. 9 is a schematic structural diagram of a communications apparatus according to an embodiment of this application.

Based on a same concept as that of the communications methods in the foregoing embodiments, as shown in FIG. 9, an embodiment of this application further provides a communications apparatus 100. The communications apparatus may be applied to the communications method described in FIG. 3. The communications apparatus 100 includes a transceiver unit 11, and may further include a processing unit 12. For example, the transceiver unit 11 is configured to send first indication information when it is determined, based on first information, to establish a first low-latency service flow for a session, where the first information includes at least one of the following: local configuration information, subscription data, or a first QoS parameter; and where the first indication information is used to indicate to set the session to an always-on session.

In an implementation, the processing unit 12 is configured to determine, based on a session context of the session, that the session is a non-always-on session.

In another implementation, the processing unit 12 is further configured to determine, based on at least the local configuration information and the first QoS parameter, that the first low-latency service flow allows to be established for the session, where the local configuration information includes a node capability of a radio access network device and/or a node capability of a user plane function network element.

In another implementation, the processing unit 12 is further configured to determine, based on at least the subscription data, that the terminal apparatus, or a DNN and/or S-NSSAI that are/is accessed by the terminal apparatus allows establishing of the first low-latency service flow, where the subscription data includes one or more of the following information: an identifier of the terminal apparatus, the DNN, or the S-NSSAI.

In another implementation, the processing unit 12 is further configured to obtain updated first information or a session modification request of the terminal apparatus; and the transceiver unit 11 is further configured to send second indication information when it is determined, based on the updated first information or the session modification request of the terminal apparatus, to delete the first low-latency service flow in the session or modify the first low-latency service flow to a non-low-latency service flow, where the second indication information is used to indicate to modify the session to the non-always-on session.

In another implementation, the processing unit 12 is further configured to determine, based on a session context of the session, that the session is the always-on session.

In another implementation, the processing unit 12 is further configured to determine, based on the session context of the session, that the session does not include a second low-latency service flow.

For more detailed descriptions of the transceiver unit 11 and the processing unit 12, refer to the related descriptions of the session management network element in the method embodiment in FIG. 3. Details are not described herein again. It should be noted that the transceiver unit may be an integrated component that has a transceiver function, or may include an independent receiving unit that has a receiving function and an independent sending unit that has a sending function, and the receiving unit and the sending unit are logically referred to as the "transceiver unit".

According to the communications apparatus provided in this embodiment of this application, the session management network element flexibly indicates, based on the local configuration information, the subscription data, and the QoS parameter, the terminal apparatus to set the session to the always-on session. This avoids a resource waste caused by setting the session to the always-on session all the time, and avoids a transmission latency caused when the session is not set to the always-on session in time, such that resource utilization and transmission efficiency are improved.

Figure 10:
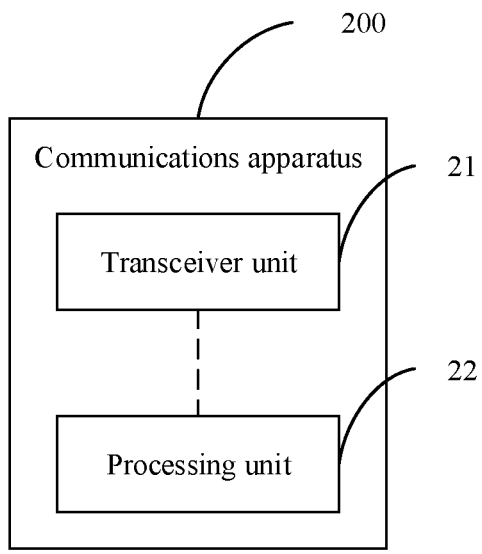
FIG. 10 is a schematic structural diagram of another communications apparatus according to an embodiment of this application.

Based on a same concept as that of the communications methods in the foregoing embodiments, as shown in FIG. 10, an embodiment of this application further provides a communications apparatus 200. The communications apparatus 200 may be applied to the communications method shown in FIG. 7. The communications apparatus 200 includes a transceiver unit 21 and a processing unit 22. For example, the transceiver unit 21 is configured to receive a first QoS parameter, where the first QoS parameter is used to indicate a QoS characteristic of a service flow. Additionally, the processing unit 22 is configured to set the session to an always-on session based on the first QoS parameter.

In an implementation, the processing unit 22 is further configured to: determine that a user plane connection is deactivated; and trigger a resume procedure of the user plane connection.

For more detailed descriptions of the transceiver unit 21 and the processing unit 22, refer to the related descriptions of the terminal apparatus in the method embodiment shown in FIG. 7. Details are not described herein again. It should be noted that the transceiver unit may be an integrated component that has a transceiver function, or may include an independent receiving unit that has a receiving function and an independent sending unit that has a sending function, and the receiving unit and the sending unit are logically referred to as the "transceiver unit".

According to the communications apparatus provided in this embodiment of this application, the terminal device may perceive, based on the received QoS parameter, that the current service flow is a low-latency service flow, and therefore set the session to the always-on session based on the QoS parameter. In this way, the always-on session is flexibly set. This avoids a resource waste caused by setting the session to the always-on session all the time, and avoids a transmission latency caused when the session is not set to the always-on session in time, such that resource utilization and transmission efficiency are improved. Before setting the session to the always-on session, the terminal apparatus needs to determine that the user plane connection is activated. If the user plane connection is deactivated, the terminal apparatus triggers the resume procedure of the user plane connection to resume the user plane connection, and then sets the session to the always-on session, to ensure that the always-on session is set reliably.

Figure 11:
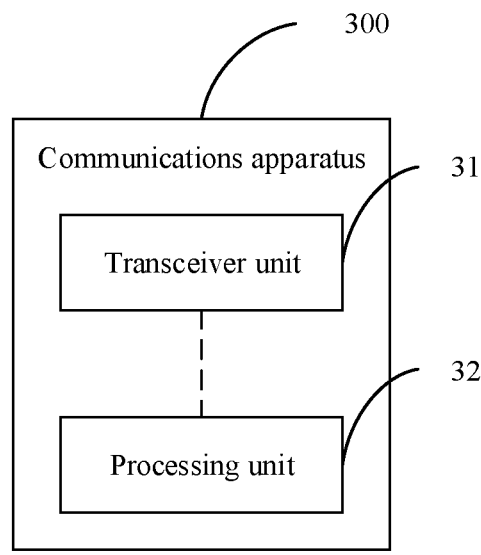
FIG. 11 is a schematic structural diagram of another communications apparatus according to an embodiment of this application.

Based on a same concept as that of the communications methods in the foregoing embodiments, as shown in FIG. 11, an embodiment of this application further provides a communications apparatus 300. The communications apparatus 300 may be applied to the communications method shown in FIG. 6. The communications apparatus 300 includes a transceiver unit 31 and a processing unit 32. For example, the transceiver unit 31 is configured to receive first indication information, where the first indication information is used to indicate to set a session to an always-on session; the processing unit 32 is configured to determine that a user plane connection is deactivated; the processing unit 32 is further configured to trigger a resume procedure of the user plane connection; and the processing unit 32 is further configured to set the session to the always-on session based on the first indication information.

For more detailed descriptions of the transceiver unit 31 and the processing unit 32, refer to the related descriptions of the terminal apparatus in the method embodiment shown in FIG. 6. Details are not described herein again. It should be noted that the transceiver unit may be an integrated component that has a transceiver function, or may include an independent receiving unit that has a receiving function and an independent sending unit that has a sending function, and the receiving unit and the sending unit are logically referred to as the "transceiver unit".

According to the communications apparatus provided in this embodiment of this application, when receiving the indication for setting the session to the always-on session, the terminal device needs to determine that the user plane connection is activated. If the user plane connection is deactivated, the terminal device triggers the resume procedure of the user plane connection to resume the user plane connection, and then sets the session to the always-on session, to ensure that the always-on session is set reliably.

An embodiment of this application further provides a communications apparatus. The communications apparatus is configured to perform the foregoing communications methods. Some or all of the foregoing communications methods may be implemented using hardware, or may be implemented using software.

Optionally, in implementation, the communications apparatus may be a chip or an integrated circuit.

Optionally, when some or all of the communications methods in the foregoing embodiments are implemented using software, the communications apparatus includes a processor, configured to execute a program. When the program is executed, the communications apparatus is enabled to implement the communications methods provided in the foregoing embodiments. The communications apparatus may further include a memory, configured to store necessary programs. These involved programs may be loaded into the memory when the communications apparatus is delivered from a factory, or may be loaded into the memory when needed later.

Optionally, the memory may be a physically independent unit, or may be integrated with the processor.

Optionally, when some or all of the communications methods in the foregoing embodiments are implemented using software, the communications apparatus may alternatively include only a processor. A memory configured to store programs is located outside the communications apparatus. The processor is connected to the memory using a circuit/wire, and is configured to read and execute the programs stored in the memory.

The processor may be a central processing unit (CPU), a network processor (NP), or a combination of a CPU and an NP.

Optionally, the processor may include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory may include a volatile memory, for example, a random-access memory (RAM). The memory may alternatively include a non-volatile memory (NVM), for example, a flash memory, a hard disk drive (HDD), or a solid-state drive (SSD). The memory may alternatively include a combination of the memories of the foregoing types.

Figure 12:
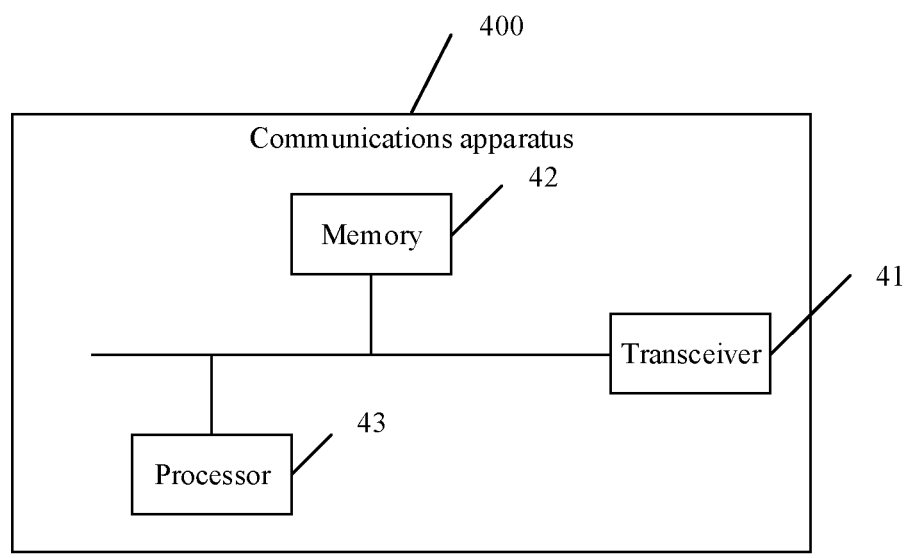
FIG. 12 is a schematic structural diagram of a communications apparatus according to an embodiment of this application.

FIG. 12 is a schematic structural diagram of another communications apparatus 400 according to an embodiment of this application. As shown in FIG. 12, the communications apparatus 400 may include: a transceiver 41, a memory 42, and a processor 43 (there may be one or more processors 43 in a network device, and one processor is used as an example in FIG. 12). In some embodiments of the present disclosure, the transceiver 41, the memory 42, and the processor 43 may be connected using a bus or in another manner. In FIG. 12, an example in which the transceiver 41, the memory 42, and the processor 43 are connected using a bus is used.

The processor 43 is configured to perform a function of the session management network element in the embodiment shown in FIG. 3.

It may be understood that functions of the function modules of the communications apparatus 400 in this embodiment may be implemented based on the method in the embodiment shown in FIG. 3. For an implementation process, refer to the related descriptions in the method embodiment. Details are not described herein again.

Figure 13:
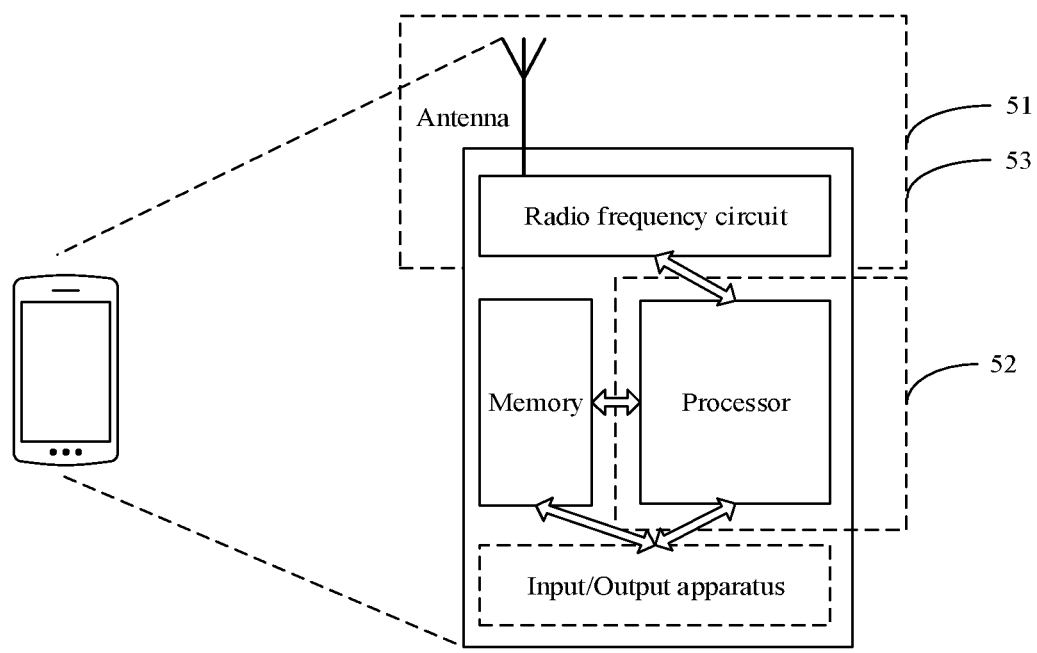
FIG. 13 is a simplified schematic structural diagram of a terminal apparatus according to an embodiment of this application.

FIG. 13 is a simplified schematic structural diagram of a terminal device. For ease of understanding and illustration, an example in which the terminal device is a mobile phone is used in FIG. 13. As shown in FIG. 13, the terminal device includes a processor, and may further include a radio frequency circuit, an antenna, and an input/output apparatus. For example, the processor may be configured to process a communication protocol and communication data, and may be further configured to: control the terminal device, execute software programs, process data of the software programs, and the like. The terminal device may further include a memory. The memory is mainly configured to store the software programs and data. These involved programs may be loaded into the memory when the communications apparatus is delivered from a factory, or may be loaded into the memory when needed later. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus such as a touchscreen, a display, or a keyboard is mainly configured to receive data entered by a user and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 13 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a receiving unit and a sending unit (which may also be collectively referred to as a transceiver unit) of the terminal device, and the processor having a processing function may be considered as a processing unit of the terminal device. As shown in FIG. 13, the terminal device includes a receiving unit 51, a processing unit 52, and a sending unit 53. The receiving unit 51 may also be referred to as a receiver, a receiver, a receiver circuit, or the like. The sending unit 53 may also be referred to as a transmitter, a transmitter, a transmitter, a transmitter circuit, or the like. The processing unit may also be referred to as a processor, a processing board, a processing module, a processing apparatus, or the like.

For example, in an embodiment, the receiving unit 51 is configured to perform a function of the session management network element in step S104' in the embodiment shown in FIG. 3; the processing unit 52 is configured to perform steps S101, S104, and S105 in the embodiment shown in FIG. 3; and the sending unit 53 is configured to perform functions of the session management network element in steps S102 and S106 in the embodiment shown in FIG. 3.

In addition, an embodiment of this application provides a communications system. The communications system includes the session management network element in the other embodiments of this application. Optionally, the session management network element may send related information such as the first indication information and the first indication information to a terminal apparatus through a radio access network device, or the terminal apparatus may send related information to the session management network element through the radio access network device. The communications system may further include the radio access network device.

Optionally, the communications system may further include the terminal apparatus. The terminal apparatus receives related information sent by the session management network element to the terminal apparatus in the other embodiments of this application, and the terminal apparatus sends related information sent by the terminal apparatus to the session management network element in this application.

It may be clearly understood by a person skilled in the art that, for the purpose of convenient and brief description, for a detailed working process of the foregoing system, apparatus, or unit, refer to a corresponding process in the foregoing method embodiments, and details are not described herein again.

In the several embodiments provided in this application, it should be understood that the disclosed system, apparatus, and method may be implemented in other manners. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium, or may be transmitted through the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (ROM), a RAM) or a magnetic medium such as a floppy disk, a hard disk, a magnetic tape, or a magnetic disk, or an optical medium such as a digital versatile disc (DVD) or a semiconductor medium such as an SSD.

What is claimed is:

1. A communications method implemented by a session management network element and comprising:
   determining that establishing of a first low-latency service flow for a session is allowed;
   determining, based on first information, to establish the first low-latency service flow, wherein the first information comprises at least one of local configuration information, subscription data, or a first quality of service (QoS) parameter; and
   sending, based on determining that establishing of the first low-latency service flow is allowed and based on determining to establish the first low-latency service flow, first indication information,
   wherein the first indication information indicates to set the session to an always-on session.

2. The communications method of claim 1, wherein before sending the first indication information, the communications method further comprises determining, based on a session context of the session, that the session is a non-always-on session.

3. The communications method of claim 1, wherein the local configuration information comprises a first node capability of a radio access network device and/or a second node capability of a user plane function network element.

4. The communications method of claim 1, wherein determining that establishing of the first low-latency service flow is allowed comprises determining, based on at least the subscription data, that:
   a terminal apparatus allows establishing of the first low-latency service flow, or
   a data network name (DNN) that is accessed by the terminal apparatus allows establishing of the first low-latency service flow, or
   single slice selection assistance information (S-NSSAI) that is accessed by the terminal apparatus allows establishing of the first low-latency service flow,
   wherein the subscription data comprises one or more of an identifier of the terminal apparatus, the DNN, or the S-NSSAI.

5. The communications method of claim 1, wherein after sending the first indication information, the communications method further comprises:
   obtaining updated first information or a session modification request of a terminal apparatus; and
   sending second indication information when determining, based on the updated first information or the session modification request of the terminal apparatus, to delete the first low-latency service flow in the session or modify the first low-latency service flow to a non-low-latency service flow, wherein the second indication information indicates to modify the session to a non-always-on session.

6. The communications method of claim 5, wherein before sending the second indication information, the communications method further comprises determining, based on a session context of the session, that the session is the always-on session.

7. The communications method of claim 5, wherein before sending the second indication information, the communications method further comprises determining, based on a session context of the session, that the session does not comprise a second low-latency service flow.

8. The communications method of claim 1, wherein the first information comprises the local configuration information.

9. The communications method of claim 1, wherein the first information comprises the subscription data.

10. A communications apparatus comprising:
    a memory configured to store instructions; and
    one or more processors coupled to the memory and configured to execute the instructions to:
       determine that establishing of a first low-latency service flow for a session is allowed;
       determine, based on first information, to establish the first low-latency service flow, wherein the first information comprises at least one of local configuration information, subscription data, or a first quality of service (QoS) parameter; and
       send first indication information based on determining that establishing of the first low-latency service flow is allowed and based on determining to establish the first low-latency service flow for the session,
       wherein the first indication information indicates to set the session to an always-on session.

11. The communications apparatus of claim 10, wherein the one or more processors are further configured to execute the instructions to determine, before sending the first indication information and based on a session context of the session, that the session is a non-always-on session.

12. The communications apparatus of claim 10, wherein the local configuration information comprises a first node capability of a radio access network device and/or a second node capability of a user plane function network element.

13. The communications apparatus of claim 10, wherein the one or more processors are further configured to execute the instructions to further determine that establishing of the first low-latency service flow is allowed by determining, based on at least the subscription data, that:
    a terminal apparatus allows establishing of the first low-latency service flow;
    a data network name (DNN) that is accessed by the terminal apparatus allows establishing of the first low-latency service flow; or
    single slice selection assistance information (S-NSSAI) that is accessed by the terminal apparatus allows establishing of the first low-latency service flow,
    wherein the subscription data comprises one or more of an identifier of the terminal apparatus, the DNN, or the S-NSSAI.

14. The communications apparatus of claim 10, wherein the one or more processors are further configured to execute the instructions to:
    obtain updated first information or a session modification request of a terminal apparatus;
    determine, based on the updated first information or the session modification request of the terminal apparatus, to delete the first low-latency service flow in the session or modify the first low-latency service flow to a non-low-latency service flow; and
    send second indication information in response to determining to delete or modify the first low-latency service flow, wherein the second indication information indicates to modify the session to a non-always-on session.

15. The communications apparatus of claim 14, wherein the one or more processors are further configured to execute the instructions to determine, before sending the second indication information and based on a session context of the session, that the session is the always-on session.

16. The communications apparatus of claim 14, wherein the one or more processors are further configured to execute the instructions to determine, before sending the second indication information and based on a session context of the session, that the session does not comprise a second low-latency service flow.

17. A communications system comprising:
a communications apparatus configured to:
determine that establishing of a first low-latency service flow for a session is allowed;
determine, based on first information, to establish the first low-latency service flow for, wherein the first information comprises at least one of local configuration information, subscription data, or a first quality of service (QoS) parameter; and
send first indication information based on determining that establishing of the first low-latency service flow is allowed and based on determining to establish the first low-latency service flow for the session, wherein the first indication information indicates to set the session to an always-on session; and
a terminal apparatus configured to receive the first indication information.

18. The communications system of claim 17, wherein the communications apparatus is further configured to determine, before sending the first indication information and based on a session context of the session, that the session is a non-always-on session.

19. The communications system of claim 17, wherein the local configuration information comprises a first node capability of a radio access network device and/or a second node capability of a user plane function network element.

20. The communications system of claim 17, wherein the communications apparatus is further configured to:
obtain updated first information of the terminal apparatus or a session modification request of the terminal apparatus;
determine, based on the updated first information or the session modification request, to delete the first low-latency service flow in the session or modify the first low-latency service flow to a non-low-latency service flow; and
send second indication information in response to determining to delete the first low-latency service flow, wherein the second indication information indicates to modify the session to a non-always-on session.

21. The communications system of claim 20, wherein the communications apparatus is further configured to determine, before sending the second indication information and based on a session context of the session, that the session is the always-on session.

* * * * *